US010585312B2

(12) United States Patent
Akutagawa et al.

(10) Patent No.: US 10,585,312 B2
(45) Date of Patent: Mar. 10, 2020

(54) LAMINATE AND OPTICAL FILM

(71) Applicant: FUJIFILM Corporation, Tokyo (JP)

(72) Inventors: Nobuyuki Akutagawa, Kanagawa (JP); Jun Takeda, Kanagawa (JP); Akio Tamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/684,219

(22) Filed: Aug. 23, 2017

(65) Prior Publication Data

US 2017/0351147 A1 Dec. 7, 2017

Related U.S. Application Data

(63) Continuation of application No. PCT/JP2016/000926, filed on Feb. 22, 2016.

(30) Foreign Application Priority Data

Feb. 25, 2015 (JP) .................................. 2015-035702

(51) Int. Cl.
*G02F 1/1337* (2006.01)
*G02F 1/1335* (2006.01)
*G02F 1/13363* (2006.01)

(52) U.S. Cl.
CPC .... *G02F 1/133711* (2013.01); *G02F 1/13363* (2013.01); *G02F 1/133504* (2013.01); *G02F 1/133536* (2013.01); *G02F 1/133784* (2013.01); *G02F 1/133788* (2013.01); *G02F 2001/133507* (2013.01); *G02F 2001/133541* (2013.01); *G02F 2001/133543* (2013.01);
(Continued)

(58) Field of Classification Search
CPC ................. G02F 1/13363; G02F 2001/133726
See application file for complete search history.

(56) References Cited

U.S. PATENT DOCUMENTS 6,519,017 B1 * 2/2003 Ichihashi ............. G02B 5/3016
349/117
2005/0078245 A1 4/2005 Sasaki et al.
(Continued)

FOREIGN PATENT DOCUMENTS

| CN | 101395504 A | 3/2009 |
| CN | 101639547 A | 2/2010 |

(Continued)

OTHER PUBLICATIONS

Chinese Office Action and Search Report dated Jan. 28, 2019, for Chinese Patent. Application No. 201680011850.9, with English translation of the Office Action.
(Continued)

*Primary Examiner* — Alexander P Gross
(74) *Attorney, Agent, or Firm* — Birch, Stewart, Kolasch & Birch, LLP

(57) ABSTRACT

A laminate is capable of forming an orientation film formed by orienting a rod-like liquid crystal compound or a disk-like liquid crystal compound having a horizontal orientation ability or a vertical orientation ability with respect to a surface of the laminate, on the surface, by using an orientation restraining force of the surface, the laminate including: a cholesteric liquid crystal layer. An optical film sequentially includes: a support; a cholesteric liquid crystal layer; and an orientation film.

13 Claims, 3 Drawing Sheets

(52) U.S. Cl.
CPC ............ *G02F 2001/133638* (2013.01); *G02F 2001/133726* (2013.01); *G02F 2001/133765* (2013.01); *G02F 2413/01* (2013.01); *G02F 2413/05* (2013.01)

(56) References Cited

U.S. PATENT DOCUMENTS

| | | | |
|---|---|---|---|
| 2009/0027612 | A1 | 1/2009 | Tomita et al. |
| 2009/0040435 | A1 | 2/2009 | Takahashi |
| 2010/0117027 | A1 | 5/2010 | Hirai et al. |
| 2017/0355907 | A1* | 12/2017 | Endo .................. C08F 2/44 |

FOREIGN PATENT DOCUMENTS

| | | | |
|---|---|---|---|
| JP | 2000-345164 | A | 12/2000 |
| JP | 2001-330725 | A | 11/2001 |
| JP | 2003-262727 | A | 9/2003 |
| JP | 2006-16599 | A | 1/2006 |
| JP | 2006-235122 | A | 9/2006 |
| JP | 2007-93864 | A | 4/2007 |
| JP | 2009-242564 | A | 10/2009 |
| JP | 2009-262564 | A | 11/2009 |
| JP | 2010-132867 | A | 6/2010 |
| KR | 10-2004-0084897 | A | 10/2004 |
| TW | 200634410 | A | 10/2006 |
| WO | WO 2007/065005 | A2 | 6/2007 |

OTHER PUBLICATIONS

Japanese Office Action dated Jan. 8, 2019, for Japanese Patent Application No. 2017-501932, with English translation.
International Search Report for PCT/JP2016/000926 (PCT/ISA/210) dated Jun. 28, 2016.
Written Opinion of the International Searching Authority for PCT/JP2016/000926 (PCT/ISA/237) dated Jun. 28, 2016.
Japanese Office Action for corresponding Japanese Application No. 2017-501932, dated Apr. 3, 2018, with Machine translation.
Korean Office Action for corresponding Korean Application No. 10-2017-7023739, dated May 21, 2018, with English translation.
Korean Office Action dated May 27, 2019 for Korean Patent Application No. 10-2017-7023739, with English translation.
Japanese Decision of Refusal dated Jul. 2, 2019 for Japanese Patent Application No. 2017-501932, with English translation.
Korean Office Action dated Nov. 29. 2019, for Korean Patent Application No. 10-2017-7023739, with English translation.

* cited by examiner

LAMINATE AND OPTICAL FILM

CROSS-REFERENCE TO RELATED APPLICATIONS

This application is a continuation application of International Application No. PCT/JP2016/000926, filed Feb. 22, 2016, the disclosure of which is incorporated herein by reference in its entirety. Further, this application claims priority from Japanese Patent Application No. 2015-035702, filed Feb. 25, 2015, the disclosure of which is incorporated herein by reference in its entirety.

BACKGROUND OF THE INVENTION

1. Field of the Invention

The present invention relates to a laminate capable of being used for forming an orientation film formed by orienting a liquid crystal compound, and an optical film including a plurality of liquid crystal layers formed by orienting a liquid crystal compound.

2. Description of the Related Art

A liquid crystal display device is widely used as a liquid crystal panel of a liquid crystal television, a personal computer, a mobile phone, a digital camera, and the like. The liquid crystal display device generally includes a liquid crystal panel member including a polarizing plate on both sides of a liquid crystal cell and performs display by controlling light from a backlight member by the liquid crystal panel member.

In recent years, realization of large-sized and high-definition liquid crystal display devices is investigated, and for example, it is necessary that high brightness and power saving of the backlight member are realized. For a backlight system which realizes high brightness and power saving, a configuration of including a so-called brightness enhancement film on an emission side of the liquid crystal cell, which transmits linearly polarized light of a predetermined polarizing axis or circularly polarized light in a predetermined direction and reflects light other than transmitted light, has been proposed.

WO2007/065005A, for example, discloses a brightness enhancement film which is formed by integrating a circularly polarized light separation element including a plurality of cholesteric liquid crystal layers having different reflection bandwidths and reflection center wavelengths on a film base material, an optical anisotropic layer, and a periodic structure.

In addition to such a brightness enhancement film, an optical film using orientation of liquid crystals may be manufactured by forming a film by applying a composition including a liquid crystal compound onto a base having an orientation restraining force on a surface thereof. In this case, in a case where a so-called "cissing phenomenon" occurs on an interface between the base having an orientation restraining force and the coated film due to poor wettability of the coated film, a non-contacted portion is formed on the interface, and the orientation restraining force of the base is not imparted to the coated film in the vicinity of the interface, and thus, an orientation defect easily occurs in an orientation film to be obtained.

In JP2000-345164A, a compound including a hydrophobic group such as a fluorine-substituted aliphatic group or an oligosiloxanoxy group and a group having at least two cyclic structures and having an excluded volume effect, in one molecule, is proposed as a liquid crystal orientation accelerating agent capable of orienting liquid crystal molecules with excellent evenness up to an upper portion in a film thickness direction, by being mixed with a composition including a liquid crystal compound. JP2000-345164A discloses a technology of including a rod-like liquid crystal compound or a disk-like liquid crystal compound as the liquid crystal compound.

In addition, JP2006-16599A proposes adding an additive formed of a (meth)acrylic copolymer including a side chain including a fluorine group and a group compatible with liquid crystal molecules at a specific ratio, into a specific amount of a liquid crystal composition, as a liquid crystal composition capable of preventing occurrence of an orientation defect.

SUMMARY OF THE INVENTION

The additive disclosed in JP2006-16599A, such as a so-called fluorine-based polymer surfactant or a silicone-based surfactant is unevenly distributed on a surface of a coated film by using a hydrophobic group and decreases a surface tension of a coating liquid. Thus, the additive contributes to the prevention of the occurrence of the cissing phenomenon (hereinafter, simply referred to as "cissing") of the coating liquid and the formation of a coated film with excellent adhesiveness with respect to a base.

However, liquid crystal molecules included in an optical film have various polymerizabilities and shapes in accordance with the purpose thereof, and thus, it is difficult to obtain the same adhesiveness regardless of the kinds of the liquid crystal molecules. In addition, even when the adhesiveness is improved, the imparting of an orientation restraining force may be disturbed due to a surfactant present on the base. For example, in a case of laminating cholesteric liquid crystal layers on each other as disclosed in WO2007/065005A, or in a case of forming a layer formed by horizontally orienting a rod-like liquid crystal compound on a base formed by vertically orienting a disk-like liquid crystal compound as disclosed in JP2003-262727A, it is difficult to sufficiently prevent occurrence of an orientation defect, even when the additive disclosed in JP2000-345164A or JP2006-16599A is used.

The present invention is made in consideration of these circumstances and an object thereof is to a provide a laminate including a liquid crystal layer formed by orienting a rod-like liquid crystal compound or a disk-like liquid crystal compound, on a surface, and capable of forming a film by being coated with an orientation film formed by orienting a rod-like liquid crystal compound or a disk-like liquid crystal compound by using an orientation restraining force of a surface of the liquid crystal layer, while preventing occurrence of an orientation defect.

Another object of the present invention is to provide an optical film including a plurality of liquid crystal layers which is formed by orienting a rod-like liquid crystal compound or a disk-like liquid crystal compound and in which occurrence of an orientation defect is reduced.

The inventors focused on that an orientation defect easily occurs in second and subsequent liquid crystal layers, when manufacturing an optical film including a plurality of liquid crystal layers formed by orienting a rod-like liquid crystal compound or a disk-like liquid crystal compound, that is, an orientation defect easily occurs, in a case of forming a film by applying an orientation film formed by orienting a rod-like liquid crystal compound or a disk-like liquid crystal compound onto a laminate including a liquid crystal layer formed by orienting a rod-like liquid crystal compound or a disk-like liquid crystal compound on a surface thereof, by using an orientation restraining force of the surface of the liquid crystal layer, while preventing occurrence of an orientation defect, and the inventors found a configuration of forming an orientation film formed by orienting a rod-like liquid crystal compound or a disk-like liquid crystal compound, on such a laminate while preventing occurrence of an orientation defect.

That is, according to the present invention, there is provided a laminate capable of forming an orientation film formed by orienting a rod-like liquid crystal compound or a disk-like liquid crystal compound having a horizontal orientation ability or a vertical orientation ability with respect to a surface of the laminate, on the surface, by using an orientation restraining force of the surface, the laminate comprising: a liquid crystal layer formed by orienting a rod-like liquid crystal compound or a disk-like liquid crystal compound having a horizontal orientation ability or a vertical orientation ability with respect to a surface of a support, on the support, in which the liquid crystal layer includes a surfactant formed of a fluorine-containing compound or a compound having a polysiloxane structure, and a molecular weight of the surfactant is equal to or smaller than 15,000.

According to another aspect of the present invention, there is provided an optical film sequentially comprising: a support; a liquid crystal layer formed by orienting a rod-like liquid crystal compound or a disk-like liquid crystal compound having a horizontal orientation ability or a vertical orientation ability with respect to a surface of the support; and an orientation film formed by orienting a rod-like liquid crystal compound or a disk-like liquid crystal compound having an orientation ability different from the orientation ability of the liquid crystal layer, in which the liquid crystal layer includes a surfactant formed of a fluorine-containing compound or a compound having a polysiloxane structure, and a molecular weight of the surfactant is equal to or smaller than 15,000.

In the laminate and the optical film of the present invention, it is preferable that the molecular weight of the surfactant is equal to or smaller than 10,000.

In the specification, the molecular weight of the surfactant, in a case where the surfactant is a high molecular compound having a molecular weight equal to or greater than 1,500, means a weight average molecular weight. In the specification, the weight average molecular weight (hereinafter, simply referred to as Mw) means a value in terms of polystyrene, obtained by using a gel permeation chromatography (GPC), and is a weight average molecular weight measured under the following conditions.

| | |
|---|---|
| Solvent | tetrahydrofuran |
| Device name | TOSOH HLC-8320GPC |
| Column | three columns of TOSOH TSKgel Super HZM-H, TSKgel |

SuperHZ4000, and TSKgel SuperHZ4000 are connected to each other and used.

| | |
|---|---|
| Column temperature | 25° C. |
| Sample concentration | 0.1 mass % |
| Flow rate | 0.35 ml/min |

Calibration curve calibration curve obtained by 7 samples of TSK standard polystyrene manufactured by TOSOH Corporation, Mw=2,800,000 to 1050 is used.

It is preferable that the surfactant is formed of a fluorine-containing compound, and in this case, the content of fluorine atoms in the liquid crystal layer is preferably equal to or greater than 0.001 mass % and smaller than 0.10 mass %.

In addition, it is preferable that the surfactant includes a polyalkylene oxide group and/or a hydroxyl group.

Further, the liquid crystal layer may be a cholesteric liquid crystal layer.

According to a first preferable aspect of the laminate and the optical film of the present invention, the orientation film is a film formed by orienting a rod-like liquid crystal compound having a vertical orientation ability with respect to the surface of the support, and the liquid crystal layer is formed by orienting a disk-like liquid crystal compound having a horizontal orientation ability.

According to a second preferable aspect of the laminate and the optical film of the present invention, the orientation film is a film formed by orienting a disk-like liquid crystal compound having a vertical orientation ability with respect to the surface of the support, and the liquid crystal layer is formed by orienting a rod-like liquid crystal compound having a horizontal orientation ability.

According to a third preferable aspect of the laminate and the optical film of the present invention, the orientation film is a film formed by orienting a rod-like liquid crystal compound having a horizontal orientation ability with respect to the surface of the support, and the liquid crystal layer is formed by orienting a disk-like liquid crystal compound having a vertical orientation ability.

According to a fourth preferable aspect of the laminate and the optical film of the present invention, the orientation film is a film formed by orienting a disk-like liquid crystal compound having a horizontal orientation ability with respect to the surface of the support, and the liquid crystal layer is formed by orienting a rod-like liquid crystal compound having a vertical orientation ability.

In the laminate and the optical film of the present invention, the orientation film may be a cholesteric liquid crystal layer.

In the laminate and the optical film of the present invention, the support may include a liquid crystal layer which is formed by orienting a rod-like liquid crystal compound or a disk-like liquid crystal compound having a horizontal orientation ability or a vertical orientation ability with respect to the surface of the support, on the surface on the liquid crystal layer side.

In the optical film of the present invention, it is preferable that the surfactant is present on the surface of the orientation film on a side opposite to the liquid crystal layer.

It is preferable that the optical film of the present invention is a brightness enhancement film in which a λ/4 plate is provided between the support and the liquid crystal layer, one of the liquid crystal layer and the orientation film is a light reflection layer having a reflection center wavelength equal to or greater than 380 nm and less than 500 nm and a reflectance peak with a half value width equal to or smaller than 100 nm, and the other one of the liquid crystal layer and the orientation film is a light reflection film having a reflection center wavelength of 500 nm to 750 nm and a reflectance peak with a half value width equal to or smaller than 200 nm, and signs of Rth (550) of the liquid crystal layer and Rth (550) of the orientation film are different from each other. The Rth (550) is a retardation in a thickness direction at a wavelength of 550 nm and the unit is nm. The Rth (550) is acquired by using Re (550) which is an in-plane retardation at a wavelength of 550 nm.

The Re (550) is a value measured by emitting light at a wavelength of 550 nm in a film normal direction, in KOBRA 21ADH or WR (manufactured by Oji Scientific Instruments). The Re (550) is measured on total six points by emitting light at a wavelength of 500 nm in each tilted direction at steps of 10° from the normal direction to 50° to one side, with respect to the film normal direction, by using an in-plane slow axis as a tilt axis (rotation axis) (in a case without a slow axis, an arbitrary direction in the film plane is set as a rotation axis), and Rth (550) is calculated by KOBRA 21ADH or WR based on the measured retardation values, an assumed value of an average refractive index, and an input film thickness value.

The laminate of the present invention includes the support, and the liquid crystal layer formed by orienting a rod-like liquid crystal compound or a disk-like liquid crystal compound having a horizontal orientation ability or a vertical orientation ability with respect to the surface of the support, and the liquid crystal layer includes a surfactant which is formed of a fluorine-containing compound or a compound having a polysiloxane structure and has a molecular weight equal to or smaller than 15,000. With such a configuration, in a case of forming an orientation film formed by orienting a rod-like liquid crystal compound or a disk-like liquid crystal compound having a horizontal orientation ability or a vertical orientation ability on the liquid crystal layer by performing coating and film formation, it is possible to prevent occurrence of cissing of a coating liquid and form an orientation film in which occurrence of an orientation defect is reduced.

According to the present invention, it is possible to provide an optical film including a plurality of liquid crystal layers which are formed by orienting a rod-like liquid crystal compound or a disk-like liquid crystal compound and in which occurrence of an orientation defect is reduced.

DESCRIPTION OF THE PREFERRED EMBODIMENTS

The following description is based on representative embodiments of the present invention, but the present invention is not limited to such embodiments. Furthermore, herein, a numerical range represented by using "to" indicates a range including numerical values before and after "to" as the lower limit value and the upper limit value.

[Laminate]

Figure 1:
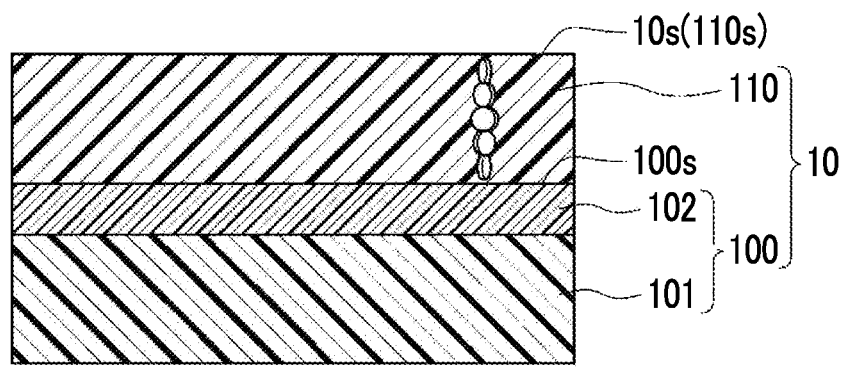
FIG. 1 is a schematic sectional view of a laminate of an embodiment according to the present invention.

An optical film of an embodiment according to the present invention will be described with reference to FIG. 1. FIG. 1 is a schematic sectional view illustrating a configuration of a laminate 10 of the embodiment. The drawings of the specification are shown by suitably changing scales of each unit, for visual recognition.

As illustrated in FIG. 1, a laminate 10 includes a liquid crystal layer 110 formed by orienting a rod-like liquid crystal compound or a disk-like liquid crystal compound having a horizontal orientation ability or a vertical orientation ability with respect to a support surface 100s, on a support 100, and the liquid crystal layer 110 includes a surfactant which is formed of a fluorine-containing compound or a compound having a polysiloxane structure and has a molecular weight equal to or smaller than 15,000.

In the present invention, the vertical orientation of the rod-like liquid crystal compound means that a long axis direction of the rod-like liquid crystal compound is oriented to be a polar angle of 90 degrees with respect to the support 100. The horizontal orientation of the rod-like liquid crystal compound means that the long axis direction of the rod-like liquid crystal compound is oriented to be horizontal with respect to the support 100. The vertical orientation of the disk-like liquid crystal compound means that the plane of the disk-like liquid crystal compound is oriented to be a polar angle of 90 degrees with respect to the support 100. The horizontal orientation of the disk-like liquid crystal compound means that the plane of the disk-like liquid crystal compound is oriented to be horizontal with respect to the support 100. Each angle may be shifted in a width of plus and minus 15 degrees. The orientation state in the present invention can be confirmed by using AxoScan (OPMF-1 manufactured by Axometrics, Inc.).

The laminate 10 can form an orientation film formed by orienting a rod-like liquid crystal compound or a disk-like liquid crystal compound having a horizontal orientation ability or a vertical orientation ability with respect to a surface 10s, on the surface 10s of the laminate 10, by using an orientation restraining force of the surface 10s, and thus, the laminate is suitable as a film forming substrate on which such an orientation film is formed.

The surface 10s of the laminate 10 is a surface 110s of the liquid crystal layer 110. The laminate 10 as a film forming substrate is a substrate on which an orientation film formed by orienting a rod-like liquid crystal compound or a disk-like liquid crystal compound having a horizontal orientation ability or a vertical orientation ability with respect to the surface 10s, is formed by using an orientation restraining force of the surface 10s, that is, an orientation restraining force of the liquid crystal layer surface 110s.

The laminate 10 can be formed by applying a liquid crystal composition which is a raw material liquid of the liquid crystal layer 110 to form a precursor film (coated film) 110m (not shown) of the liquid crystal layer 110 on the support 100, and curing the precursor film 110m.

As described in SUMMARY OF THE INVENTION, a compound including fluorine or a siloxane structure has properties of being unevenly distributed to the surface in the coated film. Accordingly, the liquid crystal layer 110 is formed by being cured in a state where the surfactant is unevenly distributed to the surface of the precursor film 110m, and therefore, the surfactant which is formed of a fluorine-containing compound or a compound having a polysiloxane structure and has a molecular weight equal to or smaller than 15,000 is present on the liquid crystal layer surface 110s.

Since such a surfactant is present on the surface, it is possible to prevent a cissing phenomenon of the coating liquid and form a coated film of the liquid crystal composition with excellent wettability on the substrate surface (laminate surface) 10s, in a case of applying the liquid crystal composition including a rod-like liquid crystal compound or a disk-like liquid crystal compound having a horizontal orientation ability or a vertical orientation ability.

The inventors found that an effect of preventing occurrence of an orientation defect of a rod-like liquid crystal compound or a disk-like liquid crystal compound changes depending whether or not the molecular weight of the surfactant formed of a fluorine-containing compound or a compound having a polysiloxane structure included in the liquid crystal layer 110 of the laminate 10 is 15,000.

When the molecular weight of the surfactant formed of a fluorine-containing compound or a compound having a polysiloxane structure included in the liquid crystal layer 110 of the laminate 10 is 15,000, it is possible to properly prevent the cissing phenomenon of the coating liquid formed of a liquid crystal composition including a rod-like liquid crystal compound or a disk-like liquid crystal compound, and to properly orient liquid crystal molecules in a direction parallel to or perpendicular to the laminate surface 10s, to form an orientation film in which occurrence an orientation defect is prevented.

In the laminate 10, in the aspect in which the molecular weight of the surfactant formed of a fluorine-containing compound or a compound having a polysiloxane structure included in the liquid crystal layer 110 is equal to or smaller than 10,000, it is also possible to allow vertical orientation or horizontal orientation of liquid crystal molecules formed of a rod-like liquid crystal compound or a disk-like liquid crystal compound by more properly preventing occurrence of an orientation defect, and setting a cholesteric liquid crystal layer (see Examples which will be described later).

Hereinafter, each constituent element of the laminate 10 will be described.

<Support>

In the laminate 10, the support 100 includes the liquid crystal layer 110 on the surface 100s, and accordingly, it is necessary that the surface 100s has an orientation restraining force. In the embodiment, the orientation layer 102 is provided on a base material 101, and therefore, an orientation restraining force is applied to the surface 100s.

Glass or a polymer film can be used as the base material 101. Examples of the material of the polymer film which is used as the base material include a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester-based resin film such as polyethylene terephthalate or polyethylene naphthalate, a polyether sulfone film, a polyacrylic resin film such as polymethyl methacrylate, a polyurethane-based resin film, a polyester film, a polycarbonate film, a polysulfone film, a polyether film, a polymethyl pentene film, a polyether ketone film, a (meth)acryl nitrile film, polyolefin, a polymer having an alicyclic structure (a norbornene-based resin (Product Name "ARTON (registered trademark)", manufactured by JSR Corporation), amorphous polyolefin (Product Name "ZEONEX (registered trademark)", manufactured by ZEON CORPORATION)), and the like. Among them, the triacetyl cellulose, the polyethylene terephthalate (PET), and the polymer having the alicyclic structure are preferable, and the triacetyl cellulose is particularly preferable.

A film thickness of the base material 101 may be approximately 5 μm to 1000 μm, is preferably 10 μm to 250 μm, and is more preferably 15 μm to 90 μm. The base material 101 may be a temporary support which is finally peeled off.

The orientation layer 102 can be disposed by means such as a rubbing treatment of an organic compound (preferably a polymer), on the base material 101, oblique vapor deposition of an inorganic compound such as silicon oxide, and formation of a layer including a micro groove. Further, an orientation layer is also known in which an orientation function is generated by applying an electric field, by applying a magnetic field, or by performing light irradiation.

Hereinafter, a rubbing treatment orientation layer and a photo orientation layer which are used by performing a rubbing treatment with respect to the surface thereof will be described as a preferred example.

—Rubbing Treatment Orientation Layer—

Examples of a polymer which can be used in the rubbing treatment orientation layer include a methacrylate-based copolymer, a styrene-based copolymer, polyolefin, polyvinyl alcohol, modified polyvinyl alcohol, poly(N-methylol acrylamide), polyester, polyimide, a vinyl acetate copolymer, carboxy methyl cellulose, polycarbonate, and the like which are described in paragraph [0022] of the specification of JP1996-338913A (JP-H08-338913A). A silane coupling agent can be used as the polymer. A water-soluble polymer (for example, poly(N-methylol acrylamide), carboxy methyl cellulose, gelatin, polyvinyl alcohol, and modified polyvinyl alcohol) is preferable, the gelatin, the polyvinyl alcohol, and the modified polyvinyl alcohol are more preferable, and the polyvinyl alcohol and the modified polyvinyl alcohol are most preferable.

It is preferable that a film thickness of the orientation layer 102 is in a range of 0.1 to 10 μm.

—Rubbing Treatment—

In general, the rubbing treatment can be performed by rubbing a surface of a film containing a polymer as a main component with paper or cloth in a constant direction. A general method of the rubbing treatment, for example, is described in "Liquid Crystal Handbook" (published by MARUZEN PUBLISHING CO., LTD. Oct. 30, 2000).

A method described in "Liquid Crystal Handbook" (published by MARUZEN PUBLISHING CO., LTD.) can be used as a method of changing a rubbing density. A rubbing density (L) is quantified by Formula (A) described below.

$$L = Nl(1 + 2\pi rn/60v) \qquad \text{Formula (A)}$$

In Formula (A), N is the number of times of rubbing, l is a contact length of a rubbing roller, r is a radius of the roller, n is the number of rotations of the roller (rpm), and v is a stage movement speed (per second).

In order to increase the rubbing density, the number of times of rubbing may increase, the contact length of the rubbing roller may lengthen, the radius of the roller may increase, the number of rotations of the roller may increase, and the stage movement speed may be slow, whereas, in order to decrease the rubbing density, the opposite may be done. In addition, conditions at the time of performing the rubbing treatment can be referred to as the description in JP4052558B.

—Photo Orientation Layer—

A photo orientation material used in the photo orientation layer which is formed by light irradiation is described in a plurality of literatures. Examples of the photo orientation material include an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, an aromatic ester compound described in JP2002-229039A, a maleimide compound and/or a nadiimide compound substituted with alkenyl which have a photo orientation unit are described in JP2002-265541A and JP2002-317013A, a photocrosslinking silane derivative described in JP4205195B and JP4205198B, and photocrosslinking polyimide, polyamide, or ester described in JP2003-520878A, JP2004-529220A, and JP4162850B as a preferred example. The azo compound, the photocrosslinking polyimide, the polyamide, or the ester is particularly preferable.

The photo orientation layer formed of the material described above is subjected to linearly polarized light irradiation or non-polarized light irradiation, and thus, the photo orientation layer is manufactured.

Herein, "the linearly polarized light irradiation" is an operation for allowing the photo orientation material to perform a photoreaction. A wavelength of light to be used is different according to the photo orientation material to be used, and the wavelength is not particularly limited insofar as the wavelength is a wavelength necessary for the photoreaction. It is preferable that a peak wavelength of light which is used in light irradiation is 200 nm to 700 nm, and ultraviolet light of which a peak wavelength is less than or equal to 400 nm is more preferable.

A light source used in the light irradiation is light source which is generally used, and examples of the light source can include a lamp such as a tungsten lamp, a halogen lamp, a xenon lamp, a xenon flash lamp, a mercury lamp, a mercury xenon lamp, and a carbon arc lamp, various lasers (for example, a semiconductor laser, a helium neon laser, an argon ion laser, a helium cadmium laser, and a YAG laser), a light emitting diode, a cathode ray tube, and the like.

A method using a polarizing plate (for example, an iodine polarizing plate, a dichroic dye polarizing plate, and a wire grid polarizing plate), a method using a prism-based element (for example, a GLAN-THOMSON prism) or a reflective polarizer using a BREWSTER angle, or a method using light exiting from a laser light source including polarized light can be adopted as means for obtaining the linearly polarized light. In addition, only light having a necessary wavelength may be selectively emitted by using a filter, a wavelength conversion element, or the like.

In a case of the linearly polarized light, a method is adopted in which light to be emitted is emitted to the upper surface with respect to the orientation layer, is vertically emitted with respect to the surface of the orientation layer from the back surface, or is emitted from an oblique direction. An incidence angle of the light is different according to the photo orientation material, and for example, the incidence angle is 0° to 90° (vertical), and is preferably 40° to 90°.

In a case where the non-polarized light is used, the non-polarized light is emitted from the oblique direction. An incidence angle is 10° to 80°, is preferably 20° to 60°, and is particularly preferably 30° to 50°.

An irradiation time is preferably 1 minute to 60 minutes, and is more preferably 1 minute to 10 minutes.

Hereinabove, the aspect in which the orientation layer 102 is provided on the base material 101 had been described as the support 100, and a method of imparting an orientation restraining force to the surface 100s is not particularly limited, and a method of performing a direct orientation treatment (for example, the rubbing treatment) to the surface of the base material 101 may be used. In this case, the orientation layer 102 may not be provided. As the base material 101 capable of being subjected to the direct orientation treatment, a PET base material film can be used, for example.

<Liquid Crystal Layer>

The liquid crystal layer 110 is a layer formed by orienting a rod-like liquid crystal compound or a disk-like liquid crystal compound having a horizontal orientation ability or a vertical orientation ability with respect to the surface 100s of the support 100, and includes the surfactant which is formed of a fluorine-containing compound or a compound having a polysiloxane structure and has a molecular weight equal to or smaller than 15,000.

(Composition for Preparing Liquid Crystal Layer)

The liquid crystal layer 110 can be formed by applying a composition for preparing a liquid crystal layer, including a rod-like liquid crystal compound or a disk-like liquid crystal compound having a horizontal orientation ability or a vertical orientation ability and the surfactant which is formed of a fluorine-containing compound or a compound having a polysiloxane structure and has a molecular weight equal to or smaller than 15,000, onto the surface 100s of the support 100 to form a film and curing the film.

—Liquid Crystal Compound—

The rod-like liquid crystal compound or the disk-like liquid crystal compound included in the composition for preparing a liquid crystal layer is preferably a liquid crystal compound including a polymerizable group. Examples of the polymerizable group can include an acryloyl group, a methacryloyl group, an epoxy group, a vinyl group, and the like. By curing the polymerizable liquid crystal compound, it is possible to immobilize the orientation of the polymerizable liquid crystal compound. In a case of a liquid crystal compound including a polymerizable group, the rod-like liquid crystal compound or the disk-like liquid crystal compound is preferably a monomer or a liquid crystal compound having a comparatively low molecular weight and a degree of polymerization smaller than 100.

Azomethines, azoxys, cyanobiphenyls, cyanophenyl esters, benzoic acid esters, cyclohexane carboxylic acid phenyl esters, cyanophenyl cyclohexanes, phenyl pyrimidines substituted with cyano, phenyl pyrimidines substituted with alkoxy, phenyl dioxanes, tolans, and alkenyl cyclohexyl benzonitriles are preferably used as the rod-like liquid crystal compound.

Compounds described in Makromol. Chem., Vol. 190, P. 2255 (1989), Advanced Materials Vol. 5, P. 107 (1993), and each publication of U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-64627, and the like can be used as the rod-like liquid crystal compound which is the polymerizable liquid crystal compound. Further, for example, a compound described in JP1999-513019A (JP-H11-513019A) or JP2007-279688A can be preferably used as the rod-like liquid crystal compound.

In Table 1, examples of rod-like liquid crystal compounds suitable as the liquid crystal layer 110, used in Examples which will be described later, are shown.

TABLE 1
| Rod-like liquid crystal compound | Kind |
|---|---|
| R1 | 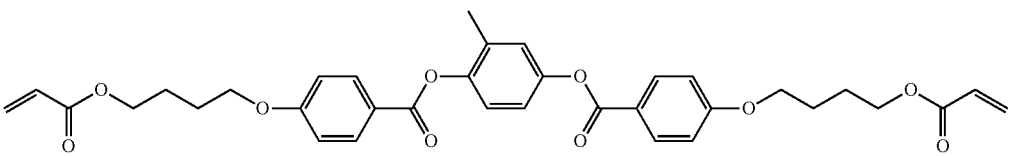 |
| R2 | 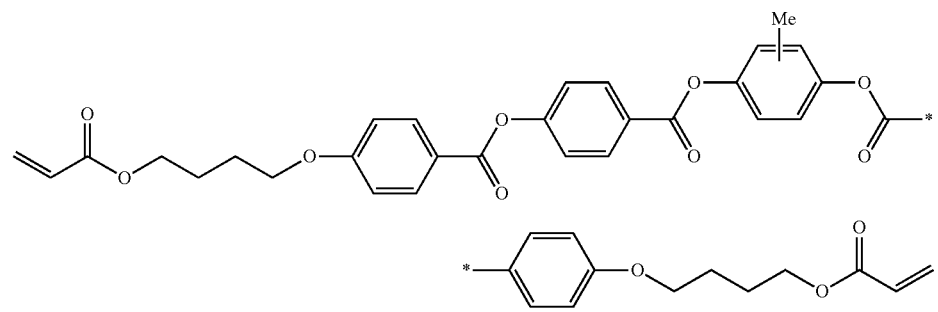 |
| R3 | 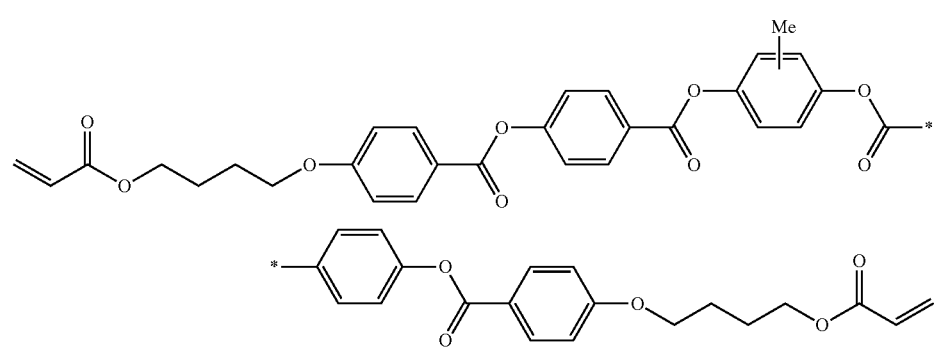 |
| R4 | 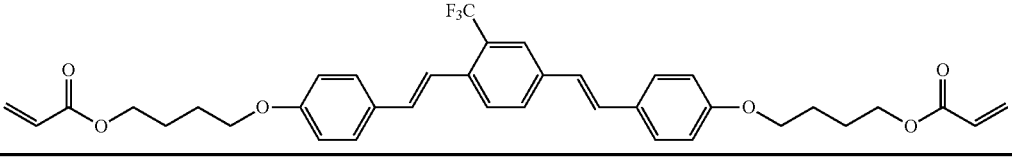 |
Examples of the disk-like liquid crystal compound include a compound described in JP2007-108732A or JP2010-244038A. In Table 2, examples of disk-like liquid crystal compound suitable as the liquid crystal layer 110, used in Examples which will be described later, are shown.
TABLE 2
| Disk-like liquid crystal compound | Kind |
|---|---|
| D1 | 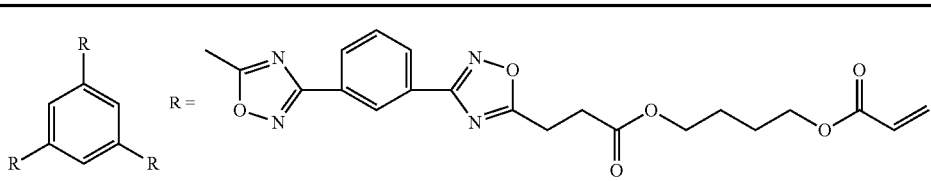 |

TABLE 2-continued

| Disk-like liquid crystal compound | Kind |
|---|---|
| D2 | 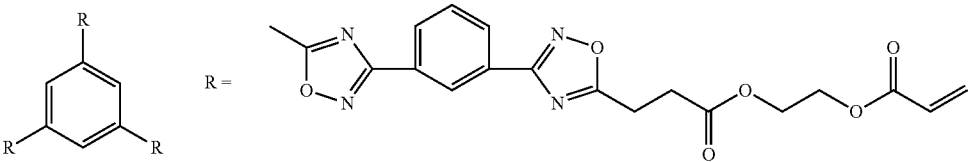 |
| D3 | 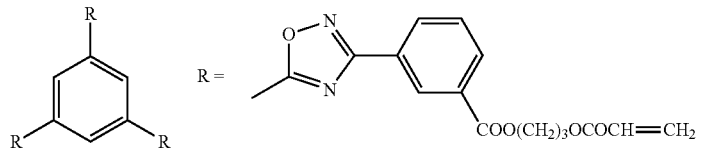 |
| D4 | 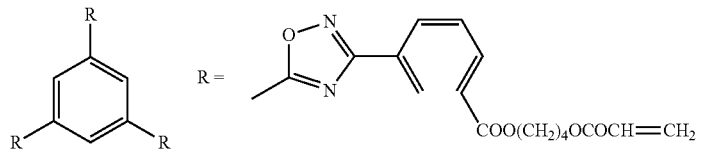 |

—Surfactant—

The surfactant included in the composition for preparing a liquid crystal layer is a fluorine-containing compound or a compound having a polysiloxane structure and has molecular weight equal to or smaller than 15,000. The compound including fluorine or a siloxane structure has properties of being unevenly distributed to the surface, and thus, by including such a surfactant in the composition for preparing a liquid crystal layer, the surfactant which is formed of a fluorine-containing compound or a compound having a polysiloxane structure included in the coated film and has a molecular weight equal to or smaller than 15,000, moves towards the surface in the coated film during a drying step of the coated film and an orientation and aging step of the liquid crystal molecules. Accordingly, it is possible to form the liquid crystal layer 110 in which such a surfactant is present, on the surface. In addition, when the molecular weight is equal to or smaller than 10,000, it is possible to more properly prevent the cissing phenomenon and occurrence of an orientation defect.

The mechanism of properly preventing the cissing phenomenon of the coating liquid formed of a liquid crystal composition including a rod-like liquid crystal compound or a disk-like liquid crystal compound and properly orienting liquid crystal molecules in a direction parallel to or perpendicular to the laminate surface 10s to form an orientation film in which occurrence an orientation defect is prevented, by setting the molecular weight to be in the range described above, is not clear, and the inventors considered that, since the surfactant having the molecular weight in the range described above properly prevents the cissing phenomenon of the coating liquid by properly improving wettability when applying the coating liquid, and moves to the surface of the coated film in the coated film due to uneven distribution properties of fluorine or a siloxane structure, as the coated film is formed, a negative effect to an orientation restraining force of the surface 10s is decreased and it is possible to form an orientation film by preventing occurrence of an orientation defect of a rod-like liquid crystal compound or a disk-like liquid crystal compound in the coated film. The surfactant formed of macromolecules having the molecular weight exceeding 15,000 is hardly extracted from the inside of the coated film to the air interface side, and the surfactant remains in the vicinity of the surface 10s, and therefore, the surfactant is assumed as a surfactant with which an orientation defect prevention effect is not sufficiently obtained.

Accordingly, a comparatively small molecular weight of the surfactant is preferable, and the molecular weight of the surfactant is preferably equal to or smaller than 10,000 and more preferably equal to or smaller than 5,000. In addition, it is preferable that the surfactant is easily compatible with or dissolved in a solvent included in the coating liquid for forming a film on the surface 10s of the laminate 10. Here, the dissolving means that transmittance of a solution is equal to or greater than 99%, when the surfactant is mixed with a solvent so that a concentration of solid contents becomes 10%. It is preferable that a solubility parameter (SP value) of the surfactant is close to a SP value of a rod-like liquid crystal compound or a disk-like liquid crystal compound included in the composition for preparing a liquid crystal layer, and a difference between these SP values is preferably equal to or smaller than 5, more preferably equal to or smaller than 4, and particularly preferably equal to or smaller than 2. The solubility parameter is a value obtained by digitizing how easy a component is soluble in a solvent and the like, and has the similar concept as polarity which is usually used in organic compounds. As the solubility parameter increases, the polarity increases. In the specification, as the SP value, a value calculated by an estimation method of Fedor, which is disclosed in pp. 66 of SP value basic and application and calculation method (information mechanism, issued on Mar. 31, 2005) written by Hideki Yamamoto, is used.

In addition, in the formation of the cholesteric liquid crystal layer, it is necessary to apply a twisting force of a chiral agent, in addition to a normal orientation restraining force. Accordingly, it is considered that a smaller operation of the surfactant present in the laminate surface 10s is preferable. As described above, it is considered that, as the molecular weight increases, an effect to the orientation restraining force increases. Therefore, in order to sufficiently obtain a twisting force of a chiral agent, a higher orientation restraining force of the laminate surface 10s is necessary. Accordingly, it is preferable that the surfactant of the laminate surface 10s is more easily extracted by the solvent in the composition of the liquid crystal layer 110, in a case where the liquid crystal layer 110 is coated, and thus, it is assumed that it is necessary that the molecular weight of the surfactant is further decreased, for example, equal to or smaller than 10,000.

The surfactant which is a fluorine-containing compound or a compound having a polysiloxane structure and has a molecular weight equal to or smaller than 15,000 is not particularly limited, and a compound including a polyalkylene oxide group and/or a hydroxyl group is preferable.

In addition, the surfactant is preferably formed of a fluorine-containing compound, and in this case, the content of fluorine atoms in the liquid crystal layer is preferably equal to or greater than 0.001 mass % and smaller than 0.10 mass % (see Examples which will be described later). From viewpoints that polarities of the liquid crystal compound included in the liquid crystal layer 110 and the fluorine-containing compound are not excessively different from each other, a compatible state is maintained, and the cissing phenomenon prevention ability and orientation of the liquid crystal compound are also excellent, a mass percentage of the fluorine part of the fluorine-containing compound is preferably 20% to 98%, more preferably 30% to 95%, and particularly preferably 35% to 90%. The fluorine part is a repeating unit including fluorine atoms in the polymer, and when fluorine atoms are included in a main chain or in a part of a side chain, it is considered as the fluorine part (that is, a repeating unit not including fluorine atoms is defined as a non-fluorine part).

In addition, a fluorine-containing polymer which has a large number of co-fluorine-based (example: $C_4F_9$, $C_6F_{13}$ groups of the compound in Table 3) part in the fluorine part and is a high-molecular-weight body (molecular weight equal to or greater than 10,000) comparatively tends to orient a rod-like liquid crystal compound or a disk-like liquid crystal compound horizontally. In contrast, a fluorine-containing compound having a large number of functional groups having high polarity such as OH group, COOH group, or NH group in the non-fluorine part tends to orient a rod-like liquid crystal compound or a disk-like liquid crystal compound vertically.

From viewpoints of uneven distribution to the interface in the coated film and surface state improvement, the content of the surfactant in the composition for preparing a liquid crystal layer is preferably equal to or smaller than 5 mass %, more preferably equal to or smaller than 4 mass %, and even more preferably equal to or smaller than 3 mass %, with respect to the total mass of the composition.

Hereinafter, as the surfactant included in the composition for preparing a liquid crystal layer, suitable compounds are exemplified. Examples of the fluorine-containing compound include a compound containing fluorine in compounds described in paragraphs 0028 to 0034 of JP2011-191582A as an orientation control agent, a fluorine-based surfactant described in JP2841611B, a fluorine-based surfactant described in paragraphs 0017 to 0019 of JP2005-272560A, and the like.

Examples of the compound having a polysiloxane structure include polymethyl phenyl siloxane, polyether-modified silicone oil, polyether-modified dimethyl polysiloxane, dimethyl silicone, diphenyl silicone, hydrogen-modified polysiloxane, vinyl-modified polysiloxane, hydroxy-modified polysiloxane, amino-modified polysiloxane, carboxyl-modified polysiloxane, chloro-modified polysiloxane, epoxy-modified polysiloxane, methacryloxy-modified polysiloxane, mercapto-modified polysiloxane, fluorine-modified polysiloxane, long-chain alkyl-modified polysiloxane, phenyl-modified polysiloxane, silicon atom-containing low molecular compound such as a silicone-modified copolymer, and the like.

Examples of a commercially available product of the silicone-based surfactant can include KF-96 and X-22-945 manufactured by Shin-Etsu Chemical Co., Ltd., TORAY SILICONE DC3PA, TORAY SILICONE DC7PA, TORAY SILICONE SH11PA, TORAY SILICONE SH21PA, TORAY SILICONE SH28PA, TORAY SILICONE SH29PA, TORAY SILICONE SH30PA, and TORAY SILICONE FS-1265-300 (all are manufactured by Dow Corning Toray Co., Ltd.), TSF-4300, TSF-4440, TSF-4445, TSF-4446, TSF-4452, and TSF-4460 (all are manufactured by GE Toshiba Silicones Co., Ltd.), POLYSILOXANE POLYMER KP341 (manufactured by Shin-Etsu Chemical Co., Ltd.), BYK-301, BYK-302, BYK-307, BYK-325, BYK-331, BYK-333, BYK-341, BYK-345, BYK-346, BYK-348, and BYK-375 (all are manufactured by BYK Japan KK.), ARON GS-30 (manufactured by TOAGOSEI CO., LTD.), SILICONE L-75, SILICONE L-76, SILICONE L-77, SILICONE L-78, SILICONE L-79, SILICONE L-520, and SILICONE L-530 (all are manufactured by Nippon Unica Systems Co., Ltd.), and the like.

In Table 3, examples of a suitable surfactant used in Examples which will be described later are shown.

TABLE 3

| Surfactant | Molecular weight | Kind |
|---|---|---|
| SF1 | 628 | 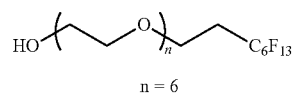<br>n = 6 |
| SF2 | 892 | 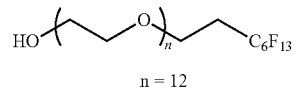<br>n = 12 |

TABLE 3-continued
| Surfactant | Molecular weight | Kind |
|---|---|---|
| SF3 | 1140 | 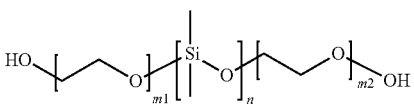<br>n = 15<br>m1, m2 = 6 |
| SF4 | 2860 | FTERGENT 245F<br>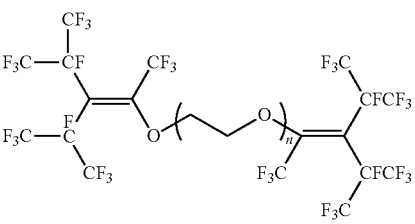 |
| SF5 | 4400 |  |
| SF6 | 6300 | 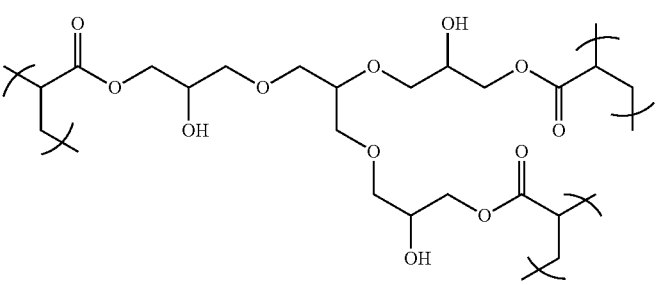 |
| SF7 | 6600 | 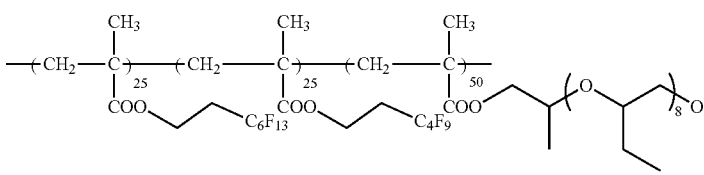 |
| SF8 | 10700 | FTERGENT 601AD |
| SF9 | 13300 | 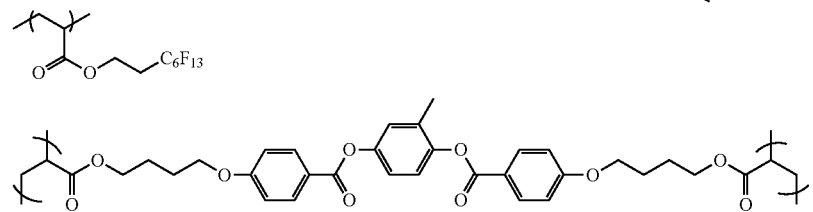 |
| SF10 | 14600 | 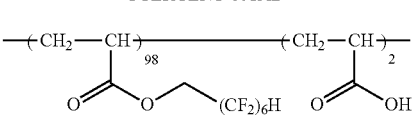 |

—Polymerization Initiator—

In a case of curing the coated film by polymerizing a polymerizable compound, such as in a case where the rod-like liquid crystal compound or the disk-like liquid crystal compound is a polymerizable liquid crystal compound, the composition for preparing a liquid crystal layer preferably includes the polymerization initiator.

Examples of the polymerization initiator include an α-carbonyl compound (described in each specification of U.S. Pat. Nos. 2,367,661A and 2,367,670A), acyloin ether (described in the specification of U.S. Pat. No. 2,448,828A), an aromatic acyloin compound substituted with α-hydrocarbon (described in the specification of U.S. Pat. No. 2,722,512A), a multinuclear quinone compound (described in each specification of U.S. Pat. Nos. 3,046,127A and 2,951,758A), a combination between a triaryl imidazole dimer and p-aminophenyl ketone (described in the specification of U.S. Pat. No. 3,549,367A), an acridine compound and a phenazine compound (described in JP1985-105667A (JP-S60-105667A) and in the specification of U.S. Pat. No. 4,239,850A), an oxadiazole compound (described in the specification of U.S. Pat. No. 4,212,970A), an acyl phosphine oxide compound (described in JP1988-40799B (JP-S63-40799B), JP1993-29234B (JP-H05-29234B), JP1998-95788A (JP-H10-95788A), and JP1998-29997A (JP-H10-29997A), and the like.

In addition, it is preferable that the polymerization initiator includes at least one kind of a compound having an extinction coefficient of approximately 50 in a range of approximately 300 nm to 800 nm (more preferably 330 nm to 500 nm). An absorption wavelength can be measured with an ultraviolet and visible spectrophotometer (UV3150 manufactured by Shimadzu Corporation), and the extinction coefficient can be calculated using this.

As a polymerization initiator which can be used, a compound including at least an aromatic group is preferable, and examples thereof include an acylphosphine compound, an acetophenone compound, an α-aminoketone compound, a benzophenone compound, a benzoin ether compound, a ketal derivative compound, a thioxanthone compound, an oxime compound, a hexaarylbiimidazole compound, a trihalomethyl compound, an azo compound, an organic peroxide, a diazonium compound, an iodonium compound, a sulfonium compound, an azinium compound, a benzoin ether compound, a ketal derivative compound, an onium salt compound such as a metallocene compound, an organic boron salt compound, and a disulfone compound.

Among these, the oxime compound, the acetophenone compound, the α-aminoketone compound, the trihalomethyl compound, the hexaarylbiimidazole compound, the thioxanthone compound, and the thiol compound are preferable, from a viewpoint of sensitivity.

Specific examples of an oxime-based initiator include a compound disclosed in JP2001-233842A, a compound disclosed in JP2000-80068A, and a compound disclosed in JP2006-342166A.

Examples of an oxime compound such as an oxime derivative suitably used as the polymerization initiator include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-(4-toluenesulfonyloxy) iminobutan-2-one, and 2-ethoxycarbonyloxyimino-1-phenylpropan-1-one.

As an oxime ester compound other than the compounds described above, a compound disclosed in JP2009-519904A in which oxime is linked to a carbazole N position, a compound disclosed in U.S. Pat. No. 7,626,957B in which a hetero substituent is introduced to a benzophenone part, a compound disclosed in JP2010-15025A and US2009-292039A in which a nitro group is introduced to a colorant part, a ketoxime-based compound disclosed in WO2009/131189A, a compound disclosed in U.S. Pat. No. 7,556,910B in which a triazine skeleton and an oxime skeleton are included in the same molecule, and a compound disclosed in JP2009-221114A having an absorption maximum at 405 nm and excellent sensitivity with respect to a g light source may be used.

As a commercially available product, IRGACURE-OXE01 or IRGACURE-OXE02 is suitably used.

In addition, as an acetophenone-based initiator, IRGACURE-907, IRGACURE-369, and IRGACURE-379 (product names: all manufactured by BASF Japan) which are commercially available products can be used. Further, as an acylphosphine-based initiator, IRGACURE-819 or DAROCUR-TPO (product names: all manufactured by BASF Japan) which are commercially available products can be used.

In addition, as the thioxanthone compound, the following exemplified compounds can be used.

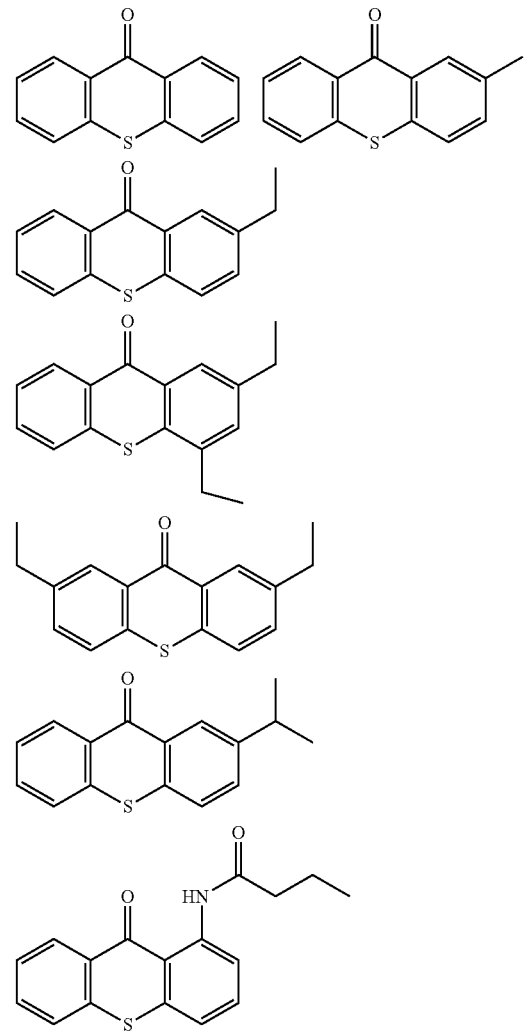

-continued

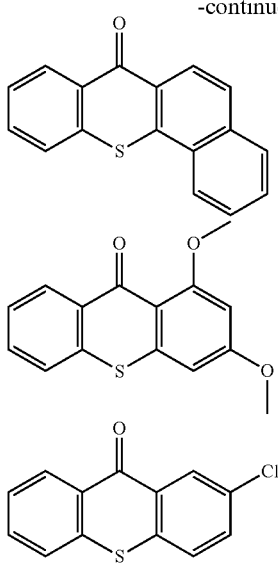

In a case of including the polymerization initiator in the composition, from a viewpoint of curing properties, the content of the polymerization initiator is preferably in a range of 0.01 to 40 mass %, more preferably in a range of 0.03 to 20 mass %, even more preferably in a range of 0.05 to 10 mass %, and particularly preferably in a range of 0.1 to 5 mass %, with respect to the total solid content of the composition. The polymerization initiator may be used alone or in combination of two or more kinds.

—Solvent—

It is preferable that the composition for preparing a liquid crystal layer contains a solvent. The solvent may be a low surface tension solvent or a standard surface tension solvent. Among them, it is preferable that the composition for forming a liquid crystal layer contains the low surface tension solvent.

The surface tension of the low surface tension solvent is 10 to 22 mN/m (10 to 22 dyn/cm), is preferably 15 to 21 mN/m, and is more preferably 18 to 20 mN/m. The surface tension of the standard surface tension solvent is greater than 22 mN/m, is preferably 23 to 50 mN/m, and is more preferably 23 to 40 mN/m.

In addition, a difference between the surface tension of the low surface tension solvent and the surface tension of the standard surface tension solvent is preferably greater than or equal to 2 mN/m, is more preferably greater than or equal to 3 mN/m, is even more preferably 4 to 20 mN/m, and is particularly preferably 5 to 15 mN/m.

Furthermore, herein, the surface tension of the solvent is a value described in a solvent handbook (published by KODANSHA LTD. in 1976). The surface tension of the solvent, for example, is a physical property value which can be measured by using an automatic surface tensiometer CBVP-A3 manufactured by Kyowa Interface Science Co., Ltd. The measurement may be performed in conditions of 25° C.

An organic solvent is preferably used as the solvent, and the low surface tension solvent and the standard surface tension solvent can be selected from the organic solvent. Examples of the organic solvent include alcohol (for example, ethanol and tert-butyl alcohol), amide (for example, N,N-dimethyl formamide), sulfoxide (for example, dimethyl sulfoxide), a heterocyclic compound (for example, pyridine), hydrocarbon (for example, heptane, cyclopentane, toluene, hexane, and tetrafluoroethylene), alkyl halide (for example, chloroform and dichloromethane), ester (for example, methyl acetate, butyl acetate, and isopropyl acetate), ketone (for example, acetone, methyl ethyl ketone, and cyclohexanone), ether (for example, tetrahydrofuran and 1,2-dimethoxy ethane), and amine (for example, triethyl amine). Two or more types of organic solvents may be used together. The solvent which is used as a solvent at the time of performing polymerization can be used as the solvent of the composition without being removed (for example, toluene and the like).

Examples of the low surface tension solvent include tert-butyl alcohol (19.5 mN/m), tetrafluoroethylene (TFE, 20.6 mN/m), triethyl amine (20.7 mN/m), cyclopentane (21.8 mN/m), heptane (19.6 mN/m), a mixed solvent formed of a combination of two or more types of the solvents, and the like. The numerical value indicates the surface tension. Among them, the tert-butyl alcohol, the tetrafluoroethylene, the triethyl amine, and the cyclopentane are preferable, the tert-butyl alcohol or the tetrafluoroethylene is more preferable, and the tert-butyl alcohol is even more preferable, from the viewpoint of stability.

Examples of the standard surface tension solvent include methyl ethyl ketone (MEK, 23.9 mN/m), methyl acetate (24.8 mN/m), methyl isobutyl ketone (MIBK, 25.4 mN/m), cyclohexanone (34.5 mN/m), acetone (23.7 mN/m), isopropyl acetate (0.0221 mN/m), a mixed solvent formed of a combination of two or more types of the solvents, and the like. The numerical value indicates the surface tension. Among them, the methyl ethyl ketone, a mixed solvent of the cyclohexanone and another solvent, a mixed solvent of the methyl acetate and the methyl isobutyl ketone, and the like are preferable.

The concentration of the solvent with respect to total mass of the composition for preparing a liquid crystal layer is preferably 95 to 50 mass %, is more preferably 93 to 60 mass %, and is even more preferably 90 to 75 mass %.

In a drying step at the time of forming the liquid crystal layer, the solvent of the composition for preparing a liquid crystal layer is preferably removed by greater than or equal to 95 mass %, is more preferably removed by greater than or equal to 98 mass %, is even more preferably removed by greater than or equal to 99 mass %, and is particularly preferably removed by substantially 100 mass %, with respect to the total amount of the solvent.

—Chiral Agent—

In a case where the liquid crystal layer 110 formed of the composition for preparing a liquid crystal layer is a layer formed by immobilizing a cholesteric liquid crystalline phase, it is preferable that the liquid crystal component contains a chiral agent.

The chiral agent can be selected from various known chiral agents (for example, a chiral agent for TN and STN described in Liquid Crystal Device Handbook, Chapter 3, Section 4-3, Page 199, edited by the 142nd committee of Japan Society for the Promotion of Science, 1989). In general, the chiral agent includes an asymmetric carbon atom, but an axial asymmetric compound or a planar asymmetric compound which does not include the asymmetric carbon atom can also be used as the chiral agent. Examples of the axial asymmetric compound or the planar asymmetric compound include binaphthyl, helicene, paracyclophane, and a derivative thereof. The chiral agent may have a polymerizable group. In a case where the chiral agent has a polymerizable group, and the rod-like liquid crystal compound to be used together also has a polymerizable group, it is possible to form a polymer having a repeating unit derived from the rod-like liquid crystal compound and a repeating unit derived from the chiral agent by a polymerization reaction between the chiral agent having the polymerizable group and the polymerizable rod-like liquid crystal compound. In this aspect, it is preferable that the polymerizable group of the chiral agent is identical to the polymerizable group of the polymerizable rod-like liquid crystal compound. Accordingly, the polymerizable group of the chiral agent is preferably an unsaturated polymerizable group, an epoxy group, or an aziridinyl group, is more preferably an unsaturated polymerizable group, and is particularly preferably an ethylenically unsaturated polymerizable group.

In addition, the chiral agent may be a liquid crystal compound.

Examples of the chiral agent exhibiting a strong twisting force include chiral agents described in JP2010-181852A, JP2003-287623A, JP2002-80851A, JP2002-80478A, and JP2002-302487A, and the chiral agents can be preferably used. Further, isomannide compounds having a corresponding structure can be used as isosorbide compounds described in the publications, and isosorbide compounds having a corresponding structure can be used as isomannide compounds described in the publications.

(Formation of Liquid Crystal Layer)

The liquid crystal layer 110 may be a layer formed by applying the composition for preparing a liquid crystal layer onto a rubbing treatment surface of the orientation layer 102 of the support 100, orienting molecules of the liquid crystal compound, and drying the obtained coated film, and may be a layer formed through a curing step in which light irradiation, heating, or the like is performed.

The composition for preparing a liquid crystal layer can be applied by a method or the like in which the composition is spread by using a suitable method such as a roll coating method, a gravure printing method, and a spin coating method. Further, the composition of the present invention can be applied by various methods such as a wire bar coating method, an extrusion coating method, a direct gravure coating method, a reverse gravure coating method, and a die coating method. In addition, the composition can be ejected from a nozzle by using an ink jet device, and thus, the coated film can also be formed.

The drying may be performed by being left to stand, or may be performed by being heated. In the drying step, an optical function derived from a liquid crystal component may be exhibited. For example, in a case where the liquid crystal component contains a liquid crystal compound, the liquid crystalline phase may be formed in a process where a solvent is removed by drying. The liquid crystalline phase may be formed by setting the temperature to a transition temperature of a liquid crystalline phase by heating. For example, first, heating is performed to a temperature of an isotropic phase, and after that, cooling is performed to the transition temperature of the liquid crystal phase, and thus, the state of the liquid crystalline phase can be stably obtained. The transition temperature of the liquid crystal phase is preferably in a range of 10° C. to 200° C., and is more preferably in a range of 10° C. to 150° C., from the viewpoint of manufacturing suitability or the like. In a case where the transition temperature of the liquid crystal phase is lower than 10° C., a cooling step or the like is necessary in order to lower the temperature to a temperature range in which the liquid crystalline phase is exhibited. In addition, in a case where the transition temperature of the liquid crystal phase is higher than 200° C., first, a high temperature is necessary in order to obtain an isotropic liquid state at a temperature higher than the temperature range in which the liquid crystalline phase is exhibited, and thus, it is disadvantageous from the viewpoint of waste of thermal energy, deformation or modification of a substrate, and the like.

For example, in a case where the liquid crystal component contains a polymerizable compound, it is preferable that the film after being dried described above is cured. In a case where the liquid crystal component contains a polymerizable liquid crystal compound, it is possible to maintain and immobilize an orientation state of the molecules of the liquid crystal compound by curing. The curing can be performed by a polymerization reaction of a polymerizable group in the polymerizable compound.

The polymerization reaction includes a thermal polymerization reaction using a thermal polymerization initiator and a photopolymerization reaction using a photopolymerization initiator, and the photopolymerization reaction is preferable. In light irradiation for polymerizing the polymerizable compound, in particular, the polymerizable liquid crystal compound, an ultraviolet ray is preferably used. Irradiation energy is preferably 50 mJ/cm$^2$ to 1,000 mJ/cm$^2$, and is more preferably 100 to 800 mJ/cm$^2$. In order to accelerate the photopolymerization reaction, the light irradiation may be performed under heating conditions.

In order to accelerate a curing reaction, ultraviolet ray irradiation may be performed under heating conditions. In addition, an oxygen concentration in the atmosphere is relevant to a degree of polymerization, and thus, in a case where a desired degree of polymerization is not obtained in the air, and a film strength is insufficient, it is preferable to decrease the oxygen concentration in the atmosphere by a method of nitrogen substitution. The oxygen concentration is preferably less than or equal to 10%, is more preferably less than or equal to 7%, and is most preferably less than or equal to 3%.

A reaction rate of the curing reaction (for example, a polymerization reaction) performed by the ultraviolet ray irradiation is preferably greater than or equal to 60%, is more preferably greater than or equal to 70%, and is even more preferably greater than or equal to 80%, from the viewpoint of retaining a mechanical strength of a layer or suppressing outflow of an unreacted substance from the layer. In order to improve the reaction rate, a method of increasing the irradiation dose of the ultraviolet ray to be emitted or polymerization under a nitrogen atmosphere or under heating conditions is effective. In addition, it is possible to use a method in which first, the polymerization is performed, and then, the polymerizable compound is retained in a temperature state higher than a polymerization temperature, and thus, the reaction is further accelerated by the thermal polymerization reaction or a method in which an ultraviolet ray is emitted again. The reaction rate can be measured by comparing absorption intensities of an infrared vibration spectrum of a reactive group (for example polymerizable group) before and after the reaction.

It is sufficient that optical properties based on the orientation of the molecules of the liquid crystal compound of the liquid crystal layer using the liquid crystal compound as the liquid crystal component, for example, optical properties of a cholesteric liquid crystalline phase are retained in the layer, and it is not necessary to exhibit liquid crystallinity of the liquid crystal composition of the liquid crystal layer after being cured any more. For example, the molecules of the liquid crystal compound have a high molecular weight by the curing reaction, and thus, the liquid crystallinity may not be exhibited any more.

The liquid crystal layer 110 may be a cholesteric liquid crystal layer formed by immobilizing a cholesteric liquid crystalline phase. The cholesteric liquid crystal layer and a manufacturing method of the cholesteric liquid crystal layer, for example, can be referred to the description in JP1989-133003A (JP-H01-133003A), JP3416302B, JP3363565B, and JP1996-271731A (JP-H08-271731A).

As described above, the laminate 10 includes the support 100, and the liquid crystal layer 110 formed by orienting the rod-like liquid crystal compound or the disk-like liquid crystal compound having a horizontal orientation ability or a vertical orientation ability with respect to the support surface 100s, and the liquid crystal layer 110 includes the surfactant which is formed of a fluorine-containing compound or a compound having a polysiloxane structure and has a molecular weight equal to or smaller than 15,000. With such a configuration, in a case of forming the orientation film formed by orienting a rod-like liquid crystal compound or a disk-like liquid crystal compound having a horizontal orientation ability or a vertical orientation ability on the liquid crystal layer 110 by performing coating and film formation, it is possible to prevent the cissing of the coating liquid and to form an orientation film in which occurrence of an orientation defect is reduced.

As preferred aspects of the laminate 10, four aspects are used with liquid crystal orientation properties of the orientation film to be formed on the surface. In a first preferred aspect of the laminate 10 and an optical film 1 which will be described later, the orientation film is a film formed by orienting a rod-like liquid crystal compound having a vertical orientation ability with respect to the surface of the support, and the liquid crystal layer is formed by orienting a disk-like liquid crystal compound having a horizontal orientation ability.

In a second preferred aspect of the laminate 10 and the optical film 1 which will be described later, the orientation film is a film formed by orienting a disk-like liquid crystal compound having a vertical orientation ability with respect to the surface of the support, and the liquid crystal layer is formed by orienting a rod-like liquid crystal compound having a horizontal orientation ability.

In a third preferred aspect of the laminate 10 and the optical film 1 which will be described later, the orientation film is a film formed by orienting a rod-like liquid crystal compound having a horizontal orientation ability with respect to the surface of the support, and the liquid crystal layer is formed by orienting a disk-like liquid crystal compound having a vertical orientation ability.

In a fourth preferred aspect of the laminate 10 and the optical film 1 which will be described later, the orientation film is a film formed by orienting a disk-like liquid crystal compound having a horizontal orientation ability with respect to the surface of the support, and the liquid crystal layer is formed by orienting a rod-like liquid crystal compound having a vertical orientation ability.

As described above, in the laminate 10, by setting the molecular weight of the surfactant included in the liquid crystal layer 110 to be equal to or smaller than 10,000, it is possible to form the orientation film which is the cholesteric liquid crystal while preventing occurrence of an orientation defect.

As shown with the optical film 1 which will be described later, the support 100 in the laminate 10 may include a liquid crystal layer 103 having a function of a λ/4 plate and the like, on the surface on the liquid crystal layer 110 side. As the liquid crystal layer 103, a liquid crystal layer formed by orienting a rod-like liquid crystal compound or a disk-like liquid crystal compound having a horizontal orientation ability or a vertical orientation ability with respect to the support surface 100s is preferable (see FIG. 2).

[Optical Film]

Figure 2:
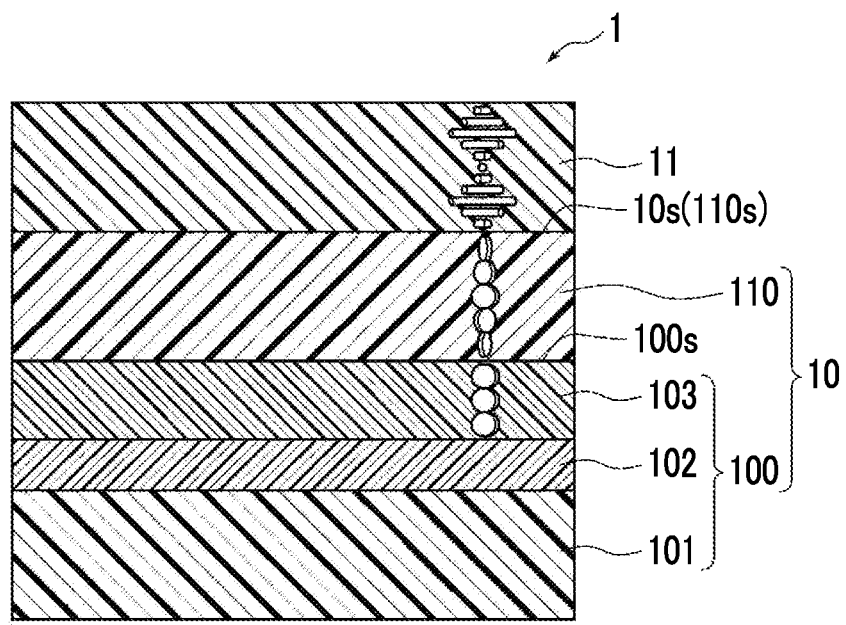
FIG. 2 is a schematic sectional view of an optical film of an embodiment according to the present invention.

The optical film of one embodiment according to the invention will be described with reference to FIG. 2. FIG. 2 is a schematic sectional view of the optical film 1 of the embodiment. The optical film of the invention can be suitably manufactured by using the laminate of the invention, and thus, in the embodiment, an aspect in which an orientation film 11 is provided on the laminate 10 of the embodiment will be described as an example. In FIG. 2, the scale of each unit is illustrated by being suitably changed in order to be easily recognized.

The optical film 1 includes the laminate 10 including the liquid crystal layer 110 formed by orienting a rod-like liquid crystal compound or a disk-like liquid crystal compound having a horizontal orientation ability or a vertical orientation ability with respect to the support surface 100s, on the support 100, and the orientation film 11 formed by orienting a rod-like liquid crystal compound or a disk-like liquid crystal compound having an orientation ability different from that of the liquid crystal layer 110, in this order. As described above, in the laminate 10, the support 100 includes the liquid crystal layer 103 having a function of a λ/4 plate and the like, on the surface on the liquid crystal layer 110 side (on the orientation layer 102). As the liquid crystal layer 103, a liquid crystal layer formed by orienting a rod-like liquid crystal compound or a disk-like liquid crystal compound having a horizontal orientation ability or a vertical orientation ability with respect to the support surface 100s is used.

The liquid crystal layer 110 includes a surfactant which is formed of a fluorine-containing compound or a compound having a polysiloxane structure and has a molecular weight equal to or smaller than 15,000.

In the optical film 1, a composition for preparing an orientation film including a rod-like liquid crystal compound or a disk-like liquid crystal compound having an orientation ability different from that of the liquid crystal layer 110 is applied onto the surface 10s of the laminate 10 of the embodiment and the orientation film is formed by orienting the rod-like liquid crystal compound or the disk-like liquid crystal compound by an orientation restraining force of the surface 10s. According to the laminate 10, in a case of forming the orientation film formed by orienting a rod-like liquid crystal compound or a disk-like liquid crystal compound having a horizontal orientation ability or a vertical orientation ability on the liquid crystal layer 110 of the laminate 10 by performing coating and film formation, it is possible to prevent the cissing of the coating liquid and to form an orientation film in which occurrence of an orientation defect is reduced, and therefore, in the orientation film 11 of the optical film 1, the occurrence of an orientation defect is reduced.

The laminate 10 includes a surfactant which improves wettability of the coating liquid on the laminate surface 10s on which the coated film is formed, and thus, it is possible to properly orient the rod-like liquid crystal compound or the disk-like liquid crystal compound while preventing the occurrence of an orientation defect, although a specific surfactant is not included in the composition for preparing an orientation film.

From a viewpoint of more properly prevent the cissing phenomenon, it is preferable that the composition for preparing an orientation film includes a surfactant formed of a fluorine-containing compound or a compound having a polysiloxane structure. It is preferable that the surfactant included in the composition for preparing an orientation film has excellent compatibility with the liquid crystal compound in the composition. In the surfactant formed of a compound including a fluorine-containing compound, the content of a fluorine part of the fluorine-containing compound is preferably 30 mass % to 98 mass %, more preferably 35 mass % to 95 mass %, and particularly preferably 40 mass % to 90 mass %, from a viewpoint of satisfying both the cissing phenomenon prevention effect and the compatibility. In addition, regarding the structure of the non-fluorine part, by introducing a compound having the similar structure as the structure of the liquid crystal compound in the composition, the compatibility can be further obtained.

Meanwhile, in a case of considering the setting of the liquid crystal layer as a plurality of liquid crystal layers, it is preferable that a surfactant is also included in the coating liquid. In a case of forming a plurality of liquid crystal layers including rod-like liquid crystal compound or a disk-like liquid crystal compound, it is preferable that the coating liquid also includes a surfactant which is formed of a fluorine-containing compound or a compound having a polysiloxane structure and has a molecular weight equal to or smaller than 15,000.

A method of applying the composition for preparing an orientation layer is not particularly limited, and examples thereof include a method of directly applying the composition for preparing an orientation layer onto the liquid crystal layer, a method of applying the orientation layer on the liquid crystal layer in the same manner as in the laminate, performing the drying, performing rubbing or a photo orientation treatment, and applying the composition for preparing an orientation layer, and a method of adding an orientation auxiliary agent to the liquid crystal layer, performing photocuring with respect to the liquid crystal layer in which the orientation auxiliary agent is unevenly distributed to the air interface side during the drying and aging, performing the rubbing, and applying the composition for preparing an orientation layer.

As described above, according to the laminate 10, the cissing phenomenon of the coating liquid is properly prevented and the coated film is formed by properly improving the wettability, when applying the coating liquid, and the molecules smoothly move to the surface of the coated film in the coated film due to uneven distribution properties of fluorine or a siloxane structure. Accordingly, the surfactant included in the liquid crystal layer 110 of the laminate 10 can also be present on the surface of the orientation film 11. As described above, in the optical film 1, in a case where the surfactant is present on the surface of the orientation film 11 on a side opposite to the liquid crystal layer 110, a liquid crystal layer formed by orienting a rod-like liquid crystal compound or a disk-like liquid crystal compound, in which occurrence of an orientation defect is reduced, can be also formed on the orientation film 11. Therefore, the optical film 1 can include a plurality of liquid crystal layers formed by orienting a rod-like liquid crystal compound or a disk-like liquid crystal compound, in which occurrence of an orientation defect is reduced.

In addition, it is preferable that the optical film 1 includes the liquid crystal layer 110 formed by immobilizing a cholesteric liquid crystalline phase, and further includes the orientation film 11 formed by immobilizing a cholesteric liquid crystalline phase.

The usage of the optical film 1 is not particularly limited. Examples of the optical film include a phase difference film, a reflective film, an optical absorptive film, and the like. More specifically, examples of the optical film include an optical compensation film, a polarizing film, and a brightness enhancement film which are used in a liquid crystal display device or the like, a heat insulating film, a film for projection, and the like.

The optical film 1 may be a support film for preparing a laminated film, in addition to an aspect of the optical film 1 of the embodiment described above.

In a preferred aspect of the optical film 1, a λ/4 plate is provided between the support 100 and the liquid crystal layer 110, and signs of Rth (550) of the liquid crystal layer 110 and Rth (550) of the orientation film 11 are different from each other. The optical film 1 having such a configuration can be suitably used as a brightness enhancement film of a backlight system of a liquid crystal display device. JP2013-174971A specifically discloses the backlight system and the liquid crystal display device including such a brightness enhancement film.

[Liquid Crystal Display Device]

Figure 3:
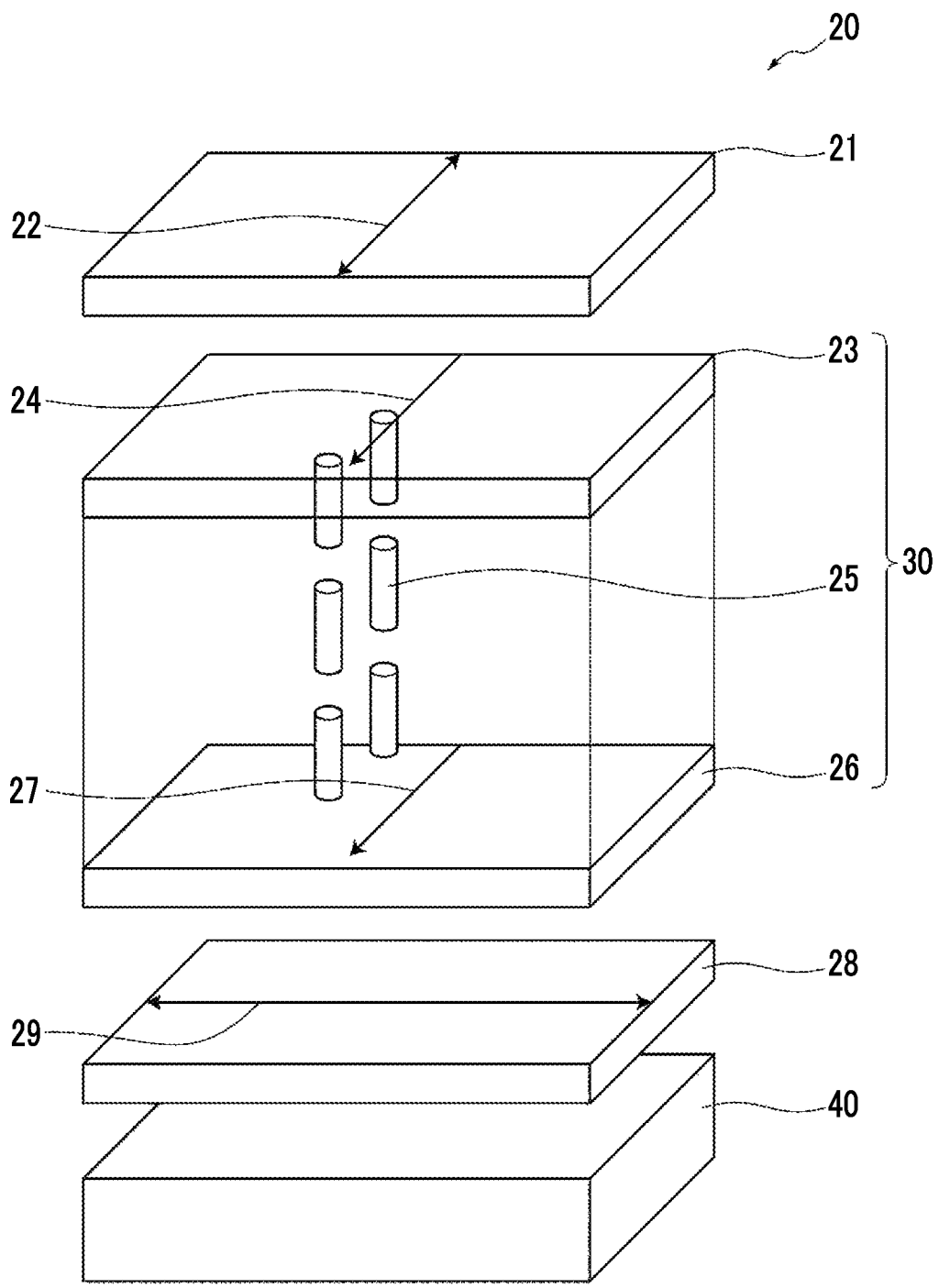
FIG. 3 is a schematic view illustrating a configuration of a liquid crystal display device of an embodiment of the present invention.
Figure 4:
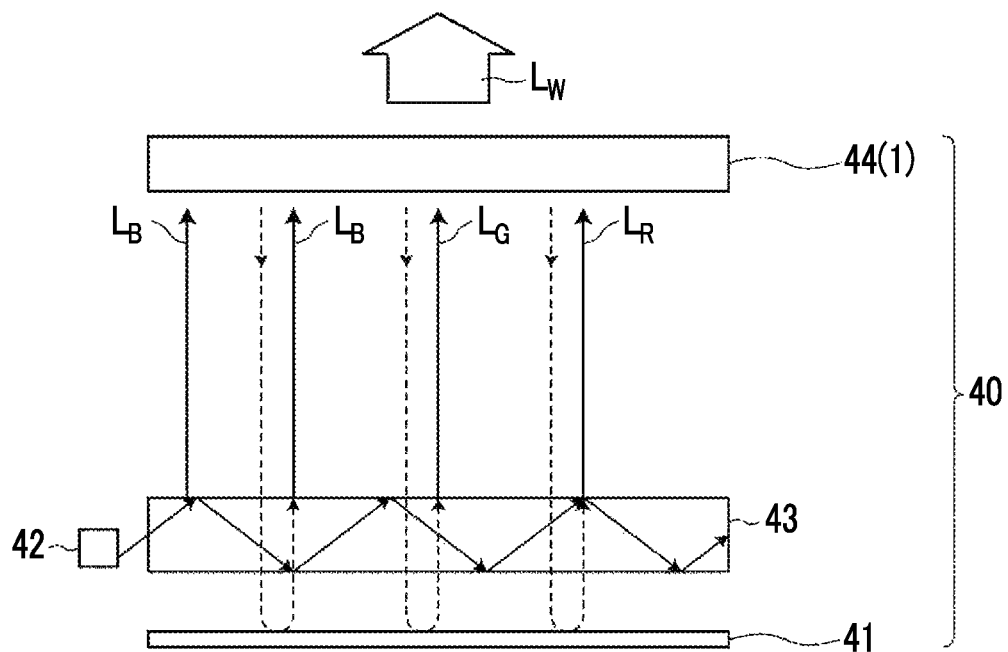
FIG. 4 is a schematic view illustrating a configuration of a backlight system of an embodiment of the present invention.

The optical film of the present invention can be used as a brightness enhancement film which is used in a backlight of a liquid crystal display device. Hereinafter, a liquid crystal display device which is an embodiment of the present invention will be described. FIG. 3 is a schematic view illustrating a configuration of a liquid crystal display device 20 which is the embodiment according to the present invention. FIG. 4 is a schematic sectional view of a backlight unit 40.

As illustrated in FIG. 3, the liquid crystal display device 20 includes a pair of polarizing plates (an upper side polarizing plate 21 and a lower side polarizing plate 28), a liquid crystal cell 30 sandwiched between the polarizing plates, and a backlight unit 40 on the surface of the lower side polarizing plate 28 on a side opposite to the liquid crystal cell, and the liquid crystal cell 30 includes a liquid crystal 25, and a liquid crystal cell upper electrode substrate 23 and a liquid crystal cell lower electrode substrate 26 which are arranged on and below the liquid crystal 25. Furthermore, the backlight unit 40 includes a polarized light emitting film, and thus, the lower side polarizing plate 28 can also be omitted.

In a case where the liquid crystal display device 20 is used as a transmissive liquid crystal display device, an aspect is obtained in which the upper side polarizing plate 21 is set to a front side (visible side) polarizing plate, the lower side polarizing plate 28 is set to a rear side (backlight side) polarizing plate, a color filter (not illustrated) is disposed between the liquid crystal 25 and the upper side polarizing plate 21. In FIGS. 3, 22 and 29 indicate directions absorption axes of the respective polarizing plates which are approximately orthogonal to each other, and 24 and 27 indicate orientation control directions of the respective electrode substrates.

As illustrated in FIG. 4, the backlight unit 40 includes a light source 42 which allows white light to exit, a light guide plate 43 which guides primary light exiting from the light source 42 and allows the primary light to exit, a brightness enhancement film 44 which is disposed on the light guide plate 43, and a reflective plate 41 which is disposed to face the brightness enhancement film 44 through the light guide plate 43. The brightness enhancement film 44 includes the optical film 1 of the invention. In addition, in the backlight unit 40, the optical film 1 is disposed so that the orientation film 11 side becomes the light guide plate 43 side.

The light source 42 is not particularly limited as long as it is a light source emitting blue light having a light emission center wavelength in a wavelength range of 430 nm to 480 nm, green light having a light emission center wavelength in a wavelength range of 500 nm to 600 nm, and red light having at least a part of a light emission intensity peak in a wavelength range of 600 nm to 700 nm. As such a light source, a light source including a blue light emitting diode (LED) which emits blue light and including a fluorescent material which emits green light and red light, when light of the blue light emitting diode is incident, a light source including a UV light emitting diode which emits UV light having a light emission center in a wavelength range equal to or greater than 300 nm and less than 430 nm, and including a fluorescent material which emits blue light, green light, and red light, when light of the UV light emitting diode is incident, a light source (pseudo white light LED) including a blue light emitting diode which emits blue light, and including a fluorescent material (yellow phosphor and the like) which emits light having a wide peak over green light to red light, when light of the blue light emitting diode is incident, or a light source including a light emitting diode of each light is preferably used.

The reflective plate 41 is irradiated from the light source and changes a polarization state reflected by the brightness enhancement film to perform the reflection. The reflective plate 41 is not particularly limited, and a well-known reflective plate can be used. Descriptions disclosed in JP3416302B, JP3363565B, JP4091978B, and JP348656B are used.

As the light guide plate 43, a well-known light guide plate can be used without any limitation.

The brightness enhancement film 44 includes a λ/4 plate between the support 100 and the liquid crystal layer 110 in the optical film 1 of the embodiment, one of the liquid crystal layer 110 and the orientation film 11 is a light reflection layer having a reflection center wavelength equal to or greater than 380 nm and less than 500 nm and a reflectance peak with a half value width equal to or smaller than 100 nm, and the other one of the liquid crystal layer and the orientation film is a light reflection layer having a reflection center wavelength of 500 nm to 750 nm and a reflectance peak with a half value width equal to or smaller than 200 nm, signs of Rth (550) of the liquid crystal layer 110 and Rth (550) of the orientation film 11 are different from each other. The brightness enhancement film according to the aspect reflects blue light ($L_B$) by the liquid crystal layer 110 and at least one of right-handed circularly polarized light and left-handed circularly polarized light of green light ($L_G$) and red light ($L_R$) by the orientation film 11, and the λ/4 plate can change light at a wavelength of λ from circularly polarized light to linearly polarized light. According to such a configuration, circularly polarized light (for example, right-handed circularly polarized light) in a first polarization state is substantially reflected by the liquid crystal layer 110 and the orientation film 11, circularly polarized light (for example, left-handed circularly polarized light) in a second polarization state is substantially transmitted through the liquid crystal layer 110 and the orientation film 11, and the transmitted light is changed into linearly polarized light by the λ/4 plate and is emitted. The direction and the polarized state of the reflected right-handed circularly polarized light become random by the reflective plate 41 and the like, the right-handed circularly polarized light is incident to the brightness enhancement film 44 again, and left-handed circularly polarized light is transmitted and emitted. As described above, by re-circulating reflected light having the polarization state, it is possible to increase usage efficiency of light and to increase intensity of light $L_W$ emitted from the backlight.

It is also preferable that the backlight unit 40 further includes a known diffusion plate or a known diffusion sheet, a prism sheet (for example, BEF series manufactured by Sumitomo 3M Limited, and the like), and a light guide device. The other members are also described in JP3416302B, JP3363565B, JP4091978B, JP3448626B, and the like, and the contents of the publications are incorporated in the present invention.

Furthermore, in the liquid crystal display device including the backlight unit described above, a driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend (OCB) cell mode can be used. It is preferable that the liquid crystal cell is in the VA mode, the OCB mode, the IPS mode, or the TN mode, but the liquid crystal cell is not limited thereto. Examples of the configuration of the liquid crystal display device in the VA mode include a configuration illustrated in FIG. 2 of JP2008-262161A. Here, a specific configuration of the liquid crystal display device is not particularly limited, and a known configuration can be adopted.

The brightness enhancement film of the backlight unit includes the optical film of the present invention, and thus, in particular, a red wavelength conversion range and a green wavelength conversion range widen, and a backlight and a liquid crystal display device having a high brightness can be obtained.

EXAMPLES

Hereinafter, the present invention will be described in more detail with reference to examples. Materials, test reagents, the amount of substances and ratios thereof, operations, and the like of the following examples can be suitably changed unless the changes cause deviance from the gist of the present invention. Accordingly, the range of the present invention will not be restrictively interpreted by the following examples.

[Compound Mainly Used]

The compounds used in Examples and Comparative Examples shown below are as follows.

<Liquid Crystal Compound>

As the rod-like liquid crystal compound and the disk-like liquid crystal compound, the compounds shown in Table 1 and Table 2 described above were used.

<Surfactant>

As the surfactant having a molecular weight equal to or smaller than 15,000, the surfactants shown in Table 3 described above were used. As the surfactant having a molecular weight exceeding 15,000, surfactants shown in Table 4 were used.

TABLE 4

| Surfactant | Molecular weight | Kind |
|---|---|---|
| SF11 | 18000 | $-(CH_2-CH)_{98}-(CH_2-CH)_2-$ with side chains $-C(O)-O-CH_2-(CF_2)_6H$ and $-C(O)-OH$ |

TABLE 4-continued
| Sur-factant | Molecular weight | Kind |
|---|---|---|
| SF12 | 20000 | 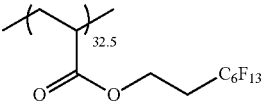 |
| SF13 | 37500 | 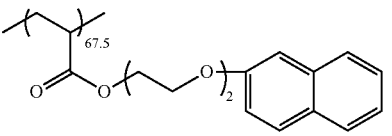 |
<Chiral Agent>
As the chiral agent used in Examples 10 to 18 and Comparative Examples 2 and 3, chiral agents shown in Table 5 were used.
TABLE 5
| Chiral agent | Kind |
|---|---|
| CH1 | 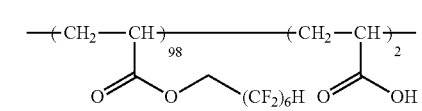 |
| CH2 | <br>R = 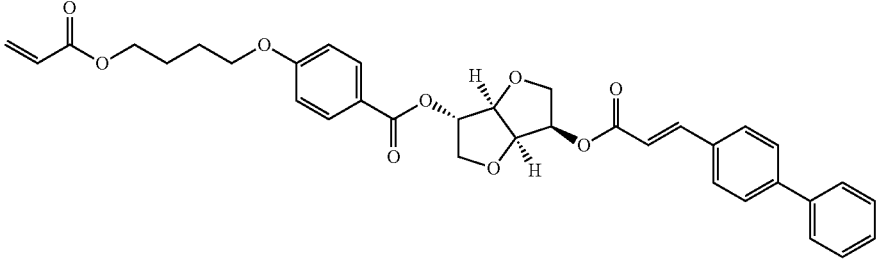 [SMILES: C=CC(=O)OCCCCOc1ccc(C(=O)O[C@H]2CO[C@H]3[C@@H]2OC[C@H]3OC(=O)/C=C/c2ccc(-c3ccccc3)cc2)cc1] |
| CH3 | Paliocolor (registered trademark) LC 756 manufactured by BASF<br>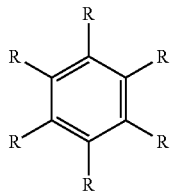 |

TABLE 5-continued

| Chiral agent | Kind |
|---|---|
| CH4 | 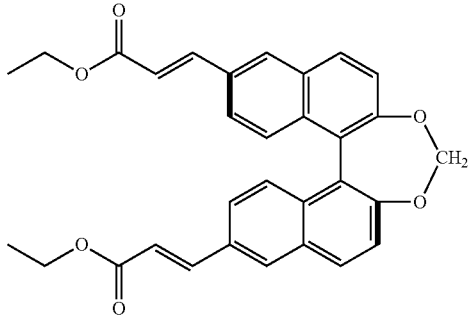 |

<Polymerization Initiator>

As the polymerization initiator, polymerization initiators shown in Table 6 were used.

TABLE 6

| Polymerization initiator | Kind |
|---|---|
| IN1 | IRGACURE (registered trademark) 2959 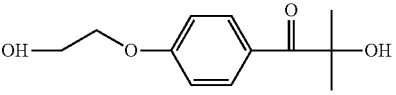 |
| IN2 | 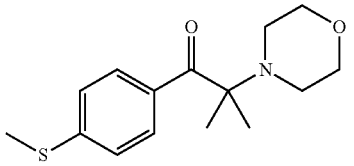 [SMILES: CSc1ccc(C(=O)C(C)(C)N2CCOCC2)cc1] |
| IN3 | IRGACURE (registered trademark) 819 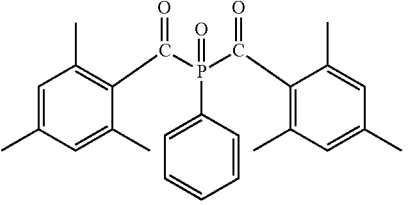 |
| IN4 | 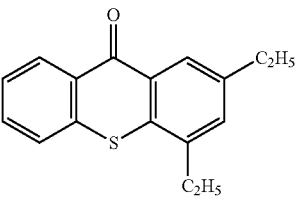 [SMILES: CCc1cc(CC)c2sc3ccccc3c(=O)c2c1] |

<Orientation Auxiliary Agent>

As the orientation auxiliary agent, orientation auxiliary agents shown in Table 7 were used. Each of orientation auxiliary agents OA1 to OA3 is a mixture (mixing mass ratio of 50:50) of two kinds of compounds having different substituted positions of a methyl group in a benzene ring substituted with trimethyl, in the following structural formulae.

TABLE 7

| Orientation auxiliary agent | Kind |
|---|---|
| OA1 | 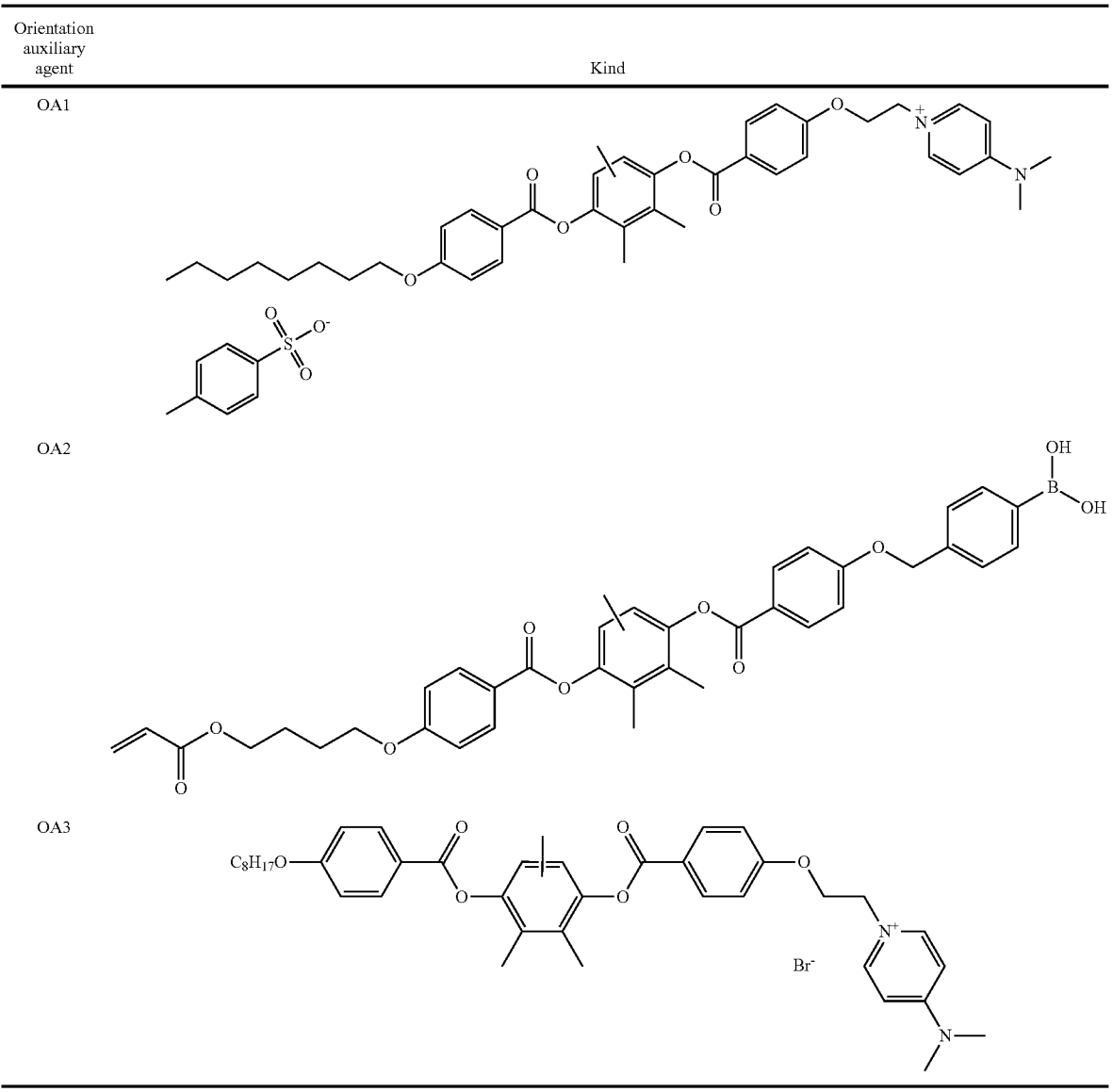 |
| OA2 | |
| OA3 | |

[Preparation of Support]
<S1: Support with Orientation Layer>
(Alkali Saponification Treatment of Cellulose Acylate Film Base Material)

A cellulose acylate film T1 ("TD40UL" manufactured by Fujifilm Corporation) passed through dielectric heating rolls at a temperature of 60° C., and a surface temperature of a film rose to 40° C., and then, an alkali solution having a composition described below was applied onto one surface of the film at a coating amount of 14 ml/m² by using a bar coater, and the film was handled for 10 seconds under a steam type far infrared heater manufactured by NORITAKE CO., LIMITED, which was heated at 110° C. Subsequently, 3 ml/m² of pure water was applied by using the same bar coater. Subsequently, water washing using a fountain coater and drainage using an air knife were repeated three times, and then, the film was dried by being handled into a drying zone at 70° C. for 10 seconds, and thus, a cellulose acylate film which had been subjected to an alkali saponification treatment was prepared.

| Alkali Solution Composition | |
|---|---|
| Potassium hydroxide | 4.7 parts by mass |
| Water | 15.8 parts by mass |
| Isopropanol | 63.7 parts by mass |
| Surfactant ($C_{14}H_{29}O(CH_2CH_2O)_{20}H$) | 1.0 part by mass |
| Propylene glycol | 14.8 parts by mass |

(Formation of Orientation Layer)

An orientation film coating liquid having a composition described below was continuously applied onto a long cellulose acetate film which has been subjected to the saponification treatment as described above by using a wire bar of #14. The orientation layer coating liquid was dried by hot air at 60° C. for 60 seconds, and further dried by hot air at 100° C. for 120 seconds. The obtained coated film was continuously subjected to a rubbing treatment. At this time, a longitudinal direction and a handling direction of the long film were parallel to each other, and a rotation axis of a rubbing roller was in a direction of 45° in a clockwise direction with respect to a film longitudinal direction.

| Orientation Layer Coating Liquid Composition | |
|---|---|
| Modified polyvinyl alcohol described below | 10.0 parts by mass |
| Water | 371.0 parts by mass |
| Methanol | 119.0 parts by mass |
| Glutaraldehyde | 0.5 parts by mass |
| Photopolymerization initiator (IN1) | 0.3 parts by mass |

(In the following structural formula, the percentage is a molar ratio.)

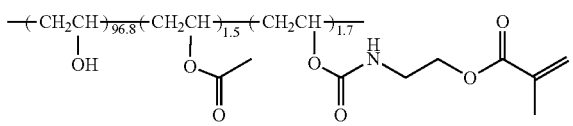

Modified Polyvinyl Alcohol

<S2: Support with Acrylic Layer>

First, a mixed liquid of a composition for forming an acrylic layer having the following composition and a solvent of methyl ethyl ketone (MEK)/methyl isobutyl ketone (MIBK)/cyclohexanone=45/45/10 (mass ratio), in which a concentration of solid contents is adjusted to be 40 mass %, was prepared, the mixed liquid was filtered through a polypropylene filter having a hole diameter of 30 μm, and a coating liquid for forming an acyrylic layer (coating liquid for forming undercoat layer) was prepared. An acrylic layer having a surface subjected to the rubbing treatment in the same manner as the orientation layer, was formed on a long cellulose acetate film which has been subjected to the alkali saponification treatment, by using this coating liquid.

| Coating Liquid for Forming Acyrylic Layer Composition | |
|---|---|
| Multifunctional acrylate (KAYARAD DPCA-20 manufactured by Nippon Kayaku Co., Ltd.) | 40.0 parts by mass |
| Polymerization initiator (IRGACURE 184 manufactured by BASF) | 2.0 parts by mass |

<S3: Support with λ/4 Plate>

The support with the orientation layer of S1 was prepared, and a coating liquid for forming a λ/4 plate including a disk-like liquid crystal compound having a composition described below was continuously applied onto the surface of the orientation layer prepared as described above by using a wire bar of #3.6. A handling velocity (V) of the film was 20 m/min. In order to dry the solvent of the coating liquid and to perform orientation and aging with respect to the disk-like liquid crystal compound, heating was performed by hot air at 60° C. for 90 seconds. Subsequently, UV irradiation (200 mJ/cm$^2$) was performed at 70° C., and thus, a λ/4 plate was formed by immobilizing the orientation of the liquid crystal compound. In addition, the support with a λ/4 plate is the laminate of the invention (Example 3).

| Coating Liquid for Forming λ/4 Plate | |
|---|---|
| Disk-like liquid crystal compound (D1) | 80.00 parts by mass |
| Disk-like liquid crystal compound (D2) | 20.00 parts by mass |
| Orientation auxiliary agent (OA1) | 0.90 parts by mass |

| Coating Liquid for Forming λ/4 Plate | |
|---|---|
| Orientation auxiliary agent (OA2) | 0.10 parts by mass |
| Surfactant (SA1, molecular weight of 628) | 0.10 parts by mass |
| Polymerization initiator (IN2) | 3.00 parts by mass |
| Methyl ethyl ketone | 301.00 parts by mass |

Examples and Comparative Examples in which Chiral Agent is not Added

Example 1

First, a coating liquid having a composition described below was prepared as the composition for preparing a liquid crystal layer. The support S1 was prepared, and a coating liquid (R-I) including a rod-like liquid crystal compound having a composition described below was continuously applied onto the orientation layer by using a wire bar of #3.6. A handling velocity (V) of the film was 20 m/min. In order to dry the solvent of the coating liquid and to perform orientation and aging with respect to the rod-like liquid crystal compound, heating was performed by hot air at 85° C. for 120 seconds. Subsequently, UV irradiation (200 mJ/cm$^2$) was performed at 60° C., and thus, a liquid crystal layer was formed by immobilizing the orientation of the liquid crystal compound, and thus, the laminate of the invention was obtained. In the liquid crystal layer, the orientation of the rod-like liquid crystal compound was in a horizontal direction with respect to the support surface.

A polyfunctional Monomer A-TMMT is pentaerythritol tetraacrylate.

| Coating Liquid Including Rod-Like Liquid Crystal Compound (R-I) | |
|---|---|
| Rod-like liquid crystal compound (R1) | 83.00 parts by mass |
| Rod-like liquid crystal compound (R2) | 15.00 parts by mass |
| Rod-like liquid crystal compound (R3) | 2.00 parts by mass |
| Multifunctional monomer A-TMMT (manufactured by Shin-Nakamura Chemical Co., Ltd.) | 1.00 part by mass |
| Surfactant (SA1, molecular weight of 628) | 0.15 parts by mass |
| Polymerization initiator (IN3) | 4.00 parts by mass |
| Methyl ethyl ketone | 165.00 parts by mass |
| Cyclohexanone | 10.00 parts by mass |

A coating liquid (D-I) including a disk-like liquid crystal compound having a composition described below was continuously applied onto the liquid crystal layer of the obtained laminate by using a wire bar of #7 so as to adjust a film thickness as 3 μm, without performing the orientation treatment such as the rubbing treatment, and a coated film was formed. Subsequently, the coated film was dried at 40° C. for 1 minute, the solvent was gasified, and then, heating and aging were performed at 115° C. for 3 minutes, and thus, a coated film in which the disk-like liquid crystal compound in the coated film was approximately homogeneously oriented, was obtained. After that, the coated film was retained at 50° C., and was subjected to ultraviolet ray irradiation (150 mJ/cm$^2$) under a nitrogen atmosphere by using a high pressure mercury lamp, and an orientation film (light reflection layer) was formed. The orientation of the disk-like liquid crystal compound in the orientation film was in a vertical direction with respect to the support surface.

| Coating Liquid Including Disk-Like Liquid Crystal Compound (D-I) | |
| --- | --- |
| Disk-like liquid crystal compound (D3) | 35.00 parts by mass |
| Disk-like liquid crystal compound (D4) | 35.00 parts by mass |
| Orientation auxiliary agent (OA3) | 1.00 part by mass |
| Surfactant (SA9, molecular weight of 13300) | 0.11 parts by mass |
| Polymerization initiator (IN3) | 3.00 parts by mass |

Example 2

The laminate of the invention was obtained in the same manner as in Example 1, except the support S1 was changed to the support S2 with an acrylic layer. In the liquid crystal layer, the orientation of the rod-like liquid crystal compound was in a vertical direction with respect to the support surface. An orientation film was formed on the liquid crystal layer of the obtained laminate in the same manner as in Example 1, by using the coating liquid (D-I) including a disk-like liquid crystal compound of Example 1 and the following coating liquid (D-II) having a different surfactant. The orientation of the disk-like liquid crystal compound in the orientation film was in a horizontal direction with respect to the support surface.

| Coating Liquid Including Disk-Like Liquid Crystal Compound (D-II) | |
| --- | --- |
| Disk-like liquid crystal compound (D3) | 35.00 parts by mass |
| Disk-like liquid crystal compound (D4) | 35.00 parts by mass |
| Orientation auxiliary agent (OA3) | 1.00 part by mass |
| Surfactant (SA7, molecular weight of 6600) | 0.11 parts by mass |
| Polymerization initiator (IN3) | 3.00 parts by mass |

Example 3

The support S1 was prepared, and a coating liquid (D-III) including a disk-like liquid crystal compound having a composition described below was continuously applied onto the orientation layer by using a wire bar of #3.6. A handling velocity (V) of the film was 20 m/min. In order to dry the solvent of the coating liquid and to perform orientation and aging with respect to the disk-like liquid crystal compound, heating was performed by hot air at 110° C. for 160 seconds. Subsequently, UV irradiation (150 mJ/cm$^2$) was performed at 50° C., a liquid crystal layer (the λ/4 plate) was formed by immobilizing the orientation of the liquid crystal compound, and thus, the laminate of the invention was obtained. The orientation of the disk-like liquid crystal compound in the liquid crystal layer was in a horizontal direction with respect to the support surface.

| Coating Liquid Including Disk-Like Liquid Crystal Compound (D-III) | |
| --- | --- |
| Disk-like liquid crystal compound (D1) | 80.00 parts by mass |
| Disk-like liquid crystal compound (D2) | 20.00 parts by mass |
| Orientation auxiliary agent (OA1) | 0.90 parts by mass |
| Orientation auxiliary agent (OA2) | 0.10 parts by mass |
| Surfactant (SA1, molecular weight of 628) | 0.15 parts by mass |
| Polymerization initiator (IN2) | 5.00 parts by mass |
| Polymerization initiator (IN4) | 1.00 part by mass |
| Methyl ethyl ketone | 189.90 parts by mass |

-continued

| Coating Liquid Including Disk-Like Liquid Crystal Compound (D-III) | |
| --- | --- |
| ter-butyl alcohol | 58.40 parts by mass |
| Cyclohexanone | 43.80 parts by mass |

A coating liquid (R-II) including a rod-like liquid crystal compound having a composition described below was continuously applied onto the liquid crystal layer of the obtained laminate in the same manner as in Example 1, by using a wire bar of #7, without performing the orientation treatment such as the rubbing treatment, and a coated film having a film thickness of 3 μm was formed. A handling velocity (V) of the film was 20 m/min. Subsequently, the coated film was heated by hot air at 85° C. for 120 seconds, the solvent in the coated film was dried, orientation and aging were performed with respect to the rod-like liquid crystal compound, and a coated film in which the rod-like liquid crystal compound in the coated film was approximately homogeneously oriented, was obtained. After that, the coated film was retained at 25° C., and was subjected to ultraviolet ray irradiation (1,000 mJ/cm$^2$) under the atmosphere by using a high pressure mercury lamp, and an orientation film (light reflection layer) was formed. The orientation of the rod-like liquid crystal compound in the orientation film was in a vertical direction with respect to the support surface.

| Coating Liquid Including Rod-Like Liquid Crystal Compound (R-II) | |
| --- | --- |
| Rod-like liquid crystal compound (R1) | 83.00 parts by mass |
| Rod-like liquid crystal compound (R2) | 15.00 parts by mass |
| Rod-like liquid crystal compound (R3) | 2.00 parts by mass |
| Multifunctional monomer A-TMMT (manufactured by Shin-Nakamura Chemical Co., Ltd.) | 1.00 part by mass |
| Polymerization initiator (IN3) | 4.00 parts by mass |
| Surfactant (SA9, molecular weight of 13300) | 0.15 parts by mass |
| Methyl ethyl ketone | 165.00 parts by mass |
| Cyclohexanone | 10.00 parts by mass |

Example 4

The laminate of the invention was obtained in the same manner as in Example 3, except the support S1 was changed to the support S3 with a λ/4 plate and a coating liquid (D-IV) including a disk-like liquid crystal compound described below was used as the composition for preparing a liquid crystal layer. The coating liquid (D-IV) is different from the composition for preparing a liquid crystal layer (coating liquid) (D-III) of Example 3 in that the orientation auxiliary agent is not included, and the coating liquid (D-IV) has a different solvent configuration, because the orientation auxiliary agent is not included. The orientation of the disk-like liquid crystal compound in the liquid crystal layer was in a vertical direction with respect to the support surface. An orientation film was formed on the liquid crystal layer of the obtained laminate by using a coating liquid (R-III) including the rod-like liquid crystal compound having the same composition as in Example 3, except that the kinds and the composition of the surfactant are different. The orientation of the rod-like liquid crystal compound in the orientation film was in a horizontal direction with respect to the support surface.

| Coating Liquid Including Disk-Like Liquid Crystal Compound (D-IV) | |
| --- | --- |
| Disk-like liquid crystal compound (D1) | 80.00 parts by mass |
| Disk-like liquid crystal compound (D2) | 20.00 parts by mass |
| Surfactant (SA1, molecular weight of 628) | 0.15 parts by mass |
| Polymerization initiator (IN1) | 5.00 parts by mass |
| Polymerization initiator (IN4) | 1.00 part by mass |
| Methyl ethyl ketone | 189.90 parts by mass |
| ter-butyl alcohol | 58.40 parts by mass |
| Cyclohexanone | 43.80 parts by mass |

| Coating Liquid Including Rod-Like Liquid Crystal Compound (R-III) | |
| --- | --- |
| Rod-like liquid crystal compound (R1) | 83.00 parts by mass |
| Rod-like liquid crystal compound (R2) | 15.00 parts by mass |
| Rod-like liquid crystal compound (R3) | 2.00 parts by mass |
| Multifunctional monomer A-TMMT (manufactured by Shin-Nakamura Chemical Co., Ltd.) | 1.00 part by mass |
| Polymerization initiator (IN3) | 4.00 parts by mass |
| Surfactant (SA7, molecular weight of 6600) | 0.15 parts by mass |
| Methyl ethyl ketone | 165.00 parts by mass |
| Cyclohexanone | 10.00 parts by mass |

Examples 5 to 9 and Comparative Example 1

The laminate of the invention was prepared in the same manner as in Example 4, except that the surfactant of the coating liquid (R-IV) including a disk-like liquid crystal compound was changed to a surfactant shown in Table 8. Then, an orientation film was formed on the obtained laminate in the same manner as in Example 4. The orientation of the liquid crystal compound in the liquid crystal layer and the orientation film of Examples 5 to 9 was the same as in Example 4. In Comparative Example 1, the orientation direction of the liquid crystal compound in the liquid crystal layer was in the same manner as in Example 4. The orientation direction in the orientation film was in the horizontal direction, but, an excellent orientation state was not obtained, which will be described in the evaluation described below.

Examples and Comparative Examples in Which Chiral Agent is Added

Example 10

The laminate of the invention was manufactured and then, an orientation film was formed thereon, in the same manner as in Example 1, except that a coating liquid obtained by adding 5.0 parts by mass of a chiral agent (CH1) to the composition for preparing a liquid crystal layer was used, and a coating liquid obtained by adding 2.9 parts by mass of a chiral agent (CH4) to the composition for preparing an orientation film was used.

Example 11

The laminate of the invention was manufactured and then, an orientation film was formed thereon, in the same manner as in Example 2, except that a coating liquid obtained by adding 5.0 parts by mass of a chiral agent (CH2) to the composition for preparing a liquid crystal layer was used, and a coating liquid obtained by adding 2.9 parts by mass of a chiral agent (CH3) to the composition for preparing an orientation film was used.

Example 12

The laminate of the invention was manufactured and then, an orientation film was formed thereon, in the same manner as in Example 3, except that a coating liquid obtained by adding 4.1 parts by mass of a chiral agent (CH4) to the composition for preparing a liquid crystal layer was used, and a coating liquid obtained by adding 5.0 parts by mass of a chiral agent (CH3) to the composition for preparing an orientation film was used.

Example 13

The laminate of the invention was manufactured and then, an orientation film was formed thereon, in the same manner as in Example 4, except that a coating liquid obtained by adding 4.1 parts by mass of a chiral agent (CH4) to the composition for preparing a liquid crystal layer was used, and a coating liquid obtained by adding 5.0 parts by mass of a chiral agent (CH3) to the composition for preparing an orientation film was used.

Examples 14 to 18 and Comparative Examples 2 and 3

The laminate of the invention was manufactured in the same manner as in Example 13, except that the surfactant of the coating liquid (R-IV) including a disk-like liquid crystal compound was changed to a surfactant shown in Table 8. Then, an orientation film was formed on the obtained laminate in the same manner as in Example 13.

The orientation of the liquid crystal compound in the liquid crystal layer and the orientation film of Examples 14 to 18 was the same as in Example 13. In Comparative Example 2, the orientation direction of the liquid crystal compound in the liquid crystal layer was in the same manner as in Example 13. The orientation direction in the orientation film was in the horizontal direction, but, an excellent orientation state was not obtained, which will be described in the evaluation described below. In Comparative Example 3, a surfactant SF12 used in the liquid crystal layer was a fluorine-containing polymer-based surfactant which has a large number of ω-fluorine-based part in the fluorine part and is a high-molecular-weight body (molecular weight equal to or greater than 10,000), and thus, the rod-like liquid crystal compound is easily horizontally oriented and an excellent orientation state was not obtained in the liquid crystal layer, either. In a surfactant SF05 in which an OH group was introduced to the fluorine part and the non-fluorine part, both of the orientation and the cissing were satisfied, and it was found that an effect was exhibited with a fluorine part percentage of 20% to 70% in the SF05. Thus, at least the effect was exhibited, in a case where the molecular weight was 1,000 to 10,000.

The prepared optical film was evaluated on the basis of the following standards.

<Preparation of Polarizing Plate>

In the same manner as disclosed in paragraphs [0219] and [0220] of JP2006-293275A, a polarizer was manufactured, and the brightness enhancement film and a polarizing plate protective film (TD40UL (manufactured by Fujifilm Corporation)) was bonded to each of both surfaces of the polarizer to manufacture an optical sheet member. As an adhesive at the time of the bonding, a commercially available PVA adhesive was used.

<Evaluation of Cissing>

A commercially available liquid crystal display device (manufactured by Panasonic Corporation, product name: TH-L42D2) was disassembled and set as a liquid crystal display device of a white LED by changing a backlight side polarizing plate into the optical sheet member manufactured as described above. When white backlight of this panel was lighted in a darkroom, a failure in which colors are different in a circular or an elliptical shape or color loss is recognized, was considered as the cissing, and the number of cissings in a film having a size of 15 cm×20 cm of each of Examples and Comparative Examples was investigated by visual evaluation.

When the evaluation standard is A or B, excellent productivity was obtained and the liquid crystal display device can be suitably used, and the evaluation standard A is more preferable.

A: the number of cissings is equal to or smaller than 1.
B: the number of cissings is 1 to 3.
C: the number of cissings is 4 to 9.
D: the number of cissings is equal to or greater than 10.

<Haze>

An orientation defect of the optical film of the invention appears as haze, and thus, evaluation was performed by measuring the haze. It is preferable that a degree of haze is low, and the degree of haze is preferably 0.01% to 2.0%. The degree of haze is more preferably equal to or lower than 1.0% and even more preferably equal to or lower than 0.5%. In regards to an optical film sample having a size of 40 mm×80 mm of the invention, the haze was measured based on JISK-6714 by using a haze meter (HGM-2DP manufactured by Suga Test Instruments Co., Ltd.) at 25° C. and 60% RH.

<Reflection Bandwidth and Reflection Center Wavelength and Transmittance Thereof>

Transmission spectra of each of Examples and Comparative Examples were measured by using a spectrophotometer UV3150 (manufactured by Shimadzu Corporation). In a case where a value of a wavelength on a short wave side among two wavelengths for transmittance of a height of ½ of the maximum peak height was set as λ1 nm and a wavelength on a long wave side was set as λ2 nm, the reflection center wavelength and the half value width can be expressed by the following equation.

Reflection center wavelength=(λ1+λ2)/2

Half value width=(λ2−λ1)

The evaluation result of each of Examples and Comparative Examples is shown in Table 8 and Table 9. Table 8 shows evaluation results regarding Examples and Comparative Examples in a case where the chiral agents are not added, and Table 9 shows evaluation results regarding Examples and Comparative Examples in a case where the chiral agents are added.

TABLE 8

| | | Film forming substrate | | | | | |
|---|---|---|---|---|---|---|---|
| | | Liquid crystal layer | | | Orientation film | | |
| | | | Surfactant | | | Surfactant | |
| | Support | Liquid crystal Kind (compound number) | Kind (molecular weight) | Concentration in liquid crystal compound (PHR) | Liquid crystal Kind (compound number) | Kind (molecular weight) | Concentration in liquid crystal compound (PHR) |
| Example 1 | S1 (with orientation layer) | Rod-like (B1, B2, B3) | SF1 (628) | 0.15% | Disk-like (A3, A4) | SF9 (13300) | 0.15% |
| Example 2 | S2 (with acrylic layer) | Rod-like (B1, B2, B3) | SF1 (628) | 0.15% | Disk-like (A3, A4) | SF7 (6600) | 0.15% |
| Example 3 | S1 (with orientation layer) | Disk-like (A1, A2) | SF1 (628) | 0.15% | Rod-like (B1, B2, B3) | SF9 (13300) | 0.15% |
| Example 4 | S3 (orientation film + λ/4 plate) | Disk-like (A1, A2) | SF1 (628) | 0.15% | Rod-like (B1, B2, B3) | SF7 (6600) | 0.15% |
| Example 5 | S3 (orientation film + λ/4 plate) | Disk-like (A1, A2) | SF2 (892) | 0.15% | Rod-like (B1, B2, B3) | SF7 (6600) | 0.15% |
| Example 6 | S3 (orientation film + λ/4 plate) | Disk-like (A1, A2) | SF4 (2860) | 0.15% | Rod-like (B1, B2, B3) | SF7 (6600) | 0.15% |
| Example 7 | S3 (orientation film + λ/4 plate) | Disk-like (A1, A2) | SF5 (4400) | 0.15% | Rod-like (B1, B2, B3) | SF7 (6600) | 0.15% |
| Example 8 | S3 (orientation film + λ/4 plate) | Disk-like (A1, A2) | SF6 (6300) | 0.15% | Rod-like (B1, B2, B3) | SF7 (6600) | 0.15% |
| Example 9 | S3 (orientation film + λ/4 plate) | Disk-like (A1, A2) | SF10 (14600) | 0.15% | Rod-like (B1, B2, B3) | SF7 (6600) | 0.15% |
| Comparative Example 1 | S3 (orientation film + λ/4 plate) | Disk-like (A1, A2) | SF13 (37500) | 0.15% | Rod-like (B1, B2, B3) | SF7 (6600) | 0.15% |

TABLE 8-continued

| | | Evaluation | | | | | |
| --- | --- | --- | --- | --- | --- | --- | --- |
| | | Liquid crystal layer | | | Orientation film | | |
| | | Orientation shape | Haze (orientation properties) | Cissing | Orientation | Haze (orientation properties) | Cissing |
| Example 1 | | Horizontal | 0.2 | B | Vertical | 0.3 | A |
| Example 2 | | Vertical | 0.3 | B | Horizontal | 0.4 | A |
| Example 3 | | Horizontal | 0.4 | B | Vertical | 0.5 | A |
| Example 4 | | Vertical | 0.3 | B | Horizontal | 0.4 | A |
| Example 5 | | Vertical | 0.3 | B | Horizontal | 0.5 | A |
| Example 6 | | Vertical | 0.3 | A | Horizontal | 0.5 | A |
| Example 7 | | Vertical | 0.4 | A | Horizontal | 0.4 | A |
| Example 8 | | Vertical | 0.4 | A | Horizontal | 0.5 | A |
| Example 9 | | Vertical | 0.4 | A | Horizontal | 0.9 | B |
| Comparative Example 1 | | Vertical | 0.5 | A | X | 10.0 | C |

TABLE 9

| | Film forming substrate | | | | | | |
| --- | --- | --- | --- | --- | --- | --- | --- |
| | | Liquid crystal layer | | | | | |
| | | | Surfactant | | Chiral agent | Orientation film | |
| | | | | Concentration | Concentration | | |
| | Substrate | Liquid crystal Kind (compound number) | Kind (molecular weight) | in liquid crystal compound (PHR) | in liquid crystal compound (PHR) | Liquid crystal Kind (compound number) | Surfactant Kind (molecular weight) |
| Example 10 | S1 (with orientation layer) | Rod-like (B1, B2, B3) | SF1 (628) | 0.15% | 5.0% | Disk-like (A3, A4) | SF7 (6600) |
| Example 11 | S2 (with acrylic layer) | Rod-like (B1, B2, B3) | SF1 (628) | 0.15% | 5.0% | Disk-like (A3, A4) | SF7 (6600) |
| Example 12 | S1 (with orientation layer) | Disk-like (A1, A2) | SF1 (628) | 0.15% | 4.1% | Rod-like (B1, B2, B3) | SF7 (6600) |
| Example 13 | S3 (orientation film + λ/4 plate) | Disk-like (A1, A2) | SF1 (628) | 0.15% | 4.1% | Rod-like (B1, B2, B3) | SF7 (6600) |
| Example 14 | S3 (orientation film + λ/4 plate) | Disk-like (A1, A2) | SF2 (892) | 0.15% | 4.1% | Rod-like (B1, B2, B3) | SF7 (6600) |
| Example 15 | S3 (orientation film + λ/4 plate) | Disk-like (A1, A2) | SF3 (1000) | 0.15% | 4.1% | Rod-like (B1, B2, B3) | SF7 (6600) |
| Example 16 | S3 (orientation film + λ/4 plate) | Disk-like (A1, A2) | SF4 (2860) | 0.15% | 4.1% | Rod-like (B1, B2, B3) | SF7 (6600) |
| Example 17 | S3 (orientation film + λ/4 plate) | Disk-like (A1, A2) | SF5 (4400) | 0.15% | 4.1% | Rod-like (B1, B2, B3) | SF7 (6600) |
| Example 18 | S3 (orientation film + λ/4 plate) | Disk-like (A1, A2) | SF8 (10700) | 0.15% | 4.1% | Rod-like (B1, B2, B3) | SF7 (6600) |
| Comparative Example 2 | S3 (orientation film + λ/4 plate) | Disk-like (A1, A2) | SF1 (18000) | 0.15% | 4.1% | Rod-like (B1, B2, B3) | SF7 (6600) |

TABLE 9-continued

| | | | | | | | | |
|---|---|---|---|---|---|---|---|---|
| Comparative Example 3 | S3 (orientation film + λ/4 plate) | Disk-like (A1, A2) | SF12 (20000) | 0.15% | 4.1% | Rod-like (B1, B2, B3) | SF7 (6600) | |

| | Orientation film | | Evaluation Liquid crystal layer | | | | |
|---|---|---|---|---|---|---|---|
| | Surfactant | Chiral agent | | | | Cholesteric properties | |
| | Concentration | Concentration | | | | | |
| | in liquid crystal compound (PHR) | in liquid crystal compound (PHR) | Orientation shape | Haze (orientation properties) | Cissing | Center wavelength (nm) | Transmittance at center wavelength (%) |
| Example 10 | 0.15% | 4.1% | Horizontal | 0.3 | B | 480 | 50% |
| Example 11 | 0.15% | 4.1% | Vertical | 0.3 | B | 480 | 50% |
| Example 12 | 0.15% | 5.0% | Horizontal | 0.3 | B | 480 | 50% |
| Example 13 | 0.15% | 5.0% | Vertical | 0.3 | B | 480 | 50% |
| Example 14 | 0.15% | 5.0% | Vertical | 0.3 | B | 480 | 50% |
| Example 15 | 0.15% | 5.0% | Vertical | 0.3 | B | 480 | 50% |
| Example 16 | 0.15% | 5.0% | Vertical | 0.3 | A | 480 | 50% |
| Example 17 | 0.15% | 5.0% | Vertical | 0.3 | A | 480 | 50% |
| Example 18 | 0.15% | 5.0% | Vertical | 0.3 | A | 480 | 50% |
| Comparative Example 2 | 0.15% | 5.0% | Vertical | 0.3 | A | 480 | 50% |
| Comparative Example 3 | 0.15% | 5.0% | X | 1.0 | A | 480 | 50% |

| | Evaluation | | | | | | |
|---|---|---|---|---|---|---|---|
| | Liquid crystal layer | Orientation film | | | | | |
| | Cholesteric properties | | | | Cholesteric properties | | |
| | Reflection bandwidth (nm) | Orientation | Haze (orientation properties) | Cissing | Center wavelength (nm) | Transmittance at center wavelength (%) | Reflection bandwidth (nm) |
| Example 10 | 62 | Vertical | 0.4 | A | 640 | 50% | 64 |
| Example 11 | 62 | Horizontal | 0.4 | A | 640 | 50% | 64 |
| Example 12 | 62 | Vertical | 0.4 | A | 640 | 50% | 64 |
| Example 13 | 62 | Horizontal | 0.4 | A | 640 | 50% | 64 |
| Example 14 | 62 | Horizontal | 0.4 | A | 640 | 50% | 64 |
| Example 15 | 62 | Horizontal | 0.4 | A | 640 | 50% | 64 |
| Example 16 | 62 | Horizontal | 0.4 | A | 640 | 50% | 64 |
| Example 17 | 62 | Horizontal | 0.4 | A | 640 | 50% | 64 |
| Example 18 | 62 | Horizontal | 0.7 | B | 640 | 50% | 64 |
| Comparative Example 2 | 62 | X | 2.2 | C | 640 | 50% | 64 |
| Comparative Example 3 | 62 | X | 3.0 | C | 640 | 50% | 64 |

EXPLANATION OF REFERENCES

1: optical film
10: laminate
100: support
101: base material
102: orientation layer
103: $\lambda/4$ plate in which disk-like liquid crystal compound is vertically oriented
110: liquid crystal layer
11: orientation film

What is claimed is:

1. A laminate capable of forming an orientation film formed by vertically orienting a disk-like liquid crystal compound on a surface of the laminate, by using an orientation restraining force of the surface, the laminate comprising:
a cholesteric liquid crystal layer formed by horizontally orienting a rod-like liquid crystal compound on the support,
wherein the cholesteric liquid crystal layer includes a surfactant formed of a fluorine-containing compound or a compound having a polysiloxane structure,
a molecular weight of the surfactant is equal to or smaller than 15,000, and
the laminate is capable of forming the orientation film directly on the cholesteric liquid crystal layer.

2. The laminate according to claim 1,
wherein the molecular weight of the surfactant is equal to or smaller than 10,000.

3. The laminate according to claim 1,
wherein the surfactant is formed of a fluorine-containing compound, and the content of fluorine atoms in the cholesteric liquid crystal layer is equal to or greater than 0.001 mass % and smaller than 0.10 mass %.

4. The laminate according to claim 1,
wherein the surfactant includes a polyalkylene oxide group and/or a hydroxyl group.

5. The laminate according to claim 1,
wherein an orientation treatment has not been performed on a surface of the cholesteric liquid crystal layer.

6. The laminate according to claim 1,
wherein the orientation film is a cholesteric liquid crystal layer.

7. The laminate according to claim 1,
wherein the support includes a liquid crystal layer which is formed by orienting a rod-like liquid crystal compound or a disk-like liquid crystal compound having a horizontal orientation ability or a vertical orientation ability with respect to the surface of the support, on the surface on the cholesteric liquid crystal layer side.

8. An optical film sequentially comprising:
a support;
a cholesteric liquid crystal layer formed by horizontally orienting a rod-like liquid crystal compound; and
an orientation film formed by vertically orienting a disk-like liquid crystal compound,
wherein the cholesteric liquid crystal layer includes a surfactant formed of a fluorine-containing compound or a compound having a polysiloxane structure,
a molecular weight of the surfactant is equal to or smaller than 15,000, and
the orientation film is formed directly on the cholesteric liquid crystal layer.

9. The optical film according to claim 8,
wherein the molecular weight of the surfactant is equal to or smaller than 10,000.

10. The optical film according to claim 8,
wherein the surfactant is formed of a fluorine-containing compound, and the content of fluorine atoms in the cholesteric liquid crystal layer is equal to or greater than 0.001 mass % and smaller than 0.10 mass %.

11. The optical film according to claim 8,
wherein the surfactant includes a polyalkylene oxide group and/or a hydroxyl group.

12. The optical film according to claim 8,
wherein the surfactant is present on the surface of the orientation film on a side opposite to the cholesteric liquid crystal layer.

13. The optical film according to claim 8,
wherein an orientation treatment has not been performed on a surface of the cholesteric liquid crystal layer.

* * * * *